(12) United States Patent
Odman

(10) Patent No.: US 7,684,380 B2
(45) Date of Patent: Mar. 23, 2010

(54) SYSTEM AND METHOD FOR HANDLING ASYNCHRONOUS DATA IN A WIRELESS NETWORK

(75) Inventor: Knut T. Odman, Vienna, VA (US)

(73) Assignee: Freescale Semiconductor, Inc., Austin, TX (US)

( * ) Notice: Subject to any disclaimer, the term of this patent is extended or adjusted under 35 U.S.C. 154(b) by 1579 days.

(21) Appl. No.: 10/347,752

(22) Filed: Jan. 22, 2003

(65) Prior Publication Data

US 2003/0152059 A1    Aug. 14, 2003

Related U.S. Application Data

(60) Provisional application No. 60/349,353, filed on Jan. 22, 2002, provisional application No. 60/349,357, filed on Jan. 22, 2002, provisional application No. 60/349,359, filed on Jan. 22, 2002.

(51) Int. Cl.
    *H04B 7/212*      (2006.01)
    *H04L 12/43*      (2006.01)
    *H04J 3/16*      (2006.01)

(52) U.S. Cl. .................. 370/348; 370/459; 370/470

(58) Field of Classification Search ................ None
See application file for complete search history.

(56) References Cited

U.S. PATENT DOCUMENTS

| | | | | |
|---|---|---|---|---|
| 5,604,742 A * | 2/1997 | Colmant et al. | ............ | 370/396 |
| 5,812,548 A * | 9/1998 | Havermans et al. | ......... | 370/353 |
| 6,011,784 A * | 1/2000 | Brown et al. | ............... | 370/329 |
| 6,172,971 B1 * | 1/2001 | Kim | ........................... | 370/348 |
| 6,411,614 B1 * | 6/2002 | Weigand | ..................... | 370/347 |
| 6,823,193 B1 * | 11/2004 | Persson et al. | ............. | 455/522 |
| 6,944,446 B1 * | 9/2005 | Kubler et al. | ........... | 455/422.1 |
| 6,967,944 B2 * | 11/2005 | Choi | ......................... | 370/348 |

(Continued)

FOREIGN PATENT DOCUMENTS

EP      0 924 896 A1     6/1999

(Continued)

OTHER PUBLICATIONS

R. Prasad, W. Mohr, W. Konhauser: "Third Generation Mobile Communications Systems," 2000, Artech House, Boston, London XP002246167.

(Continued)

*Primary Examiner*—Kwang B Yao
*Assistant Examiner*—Jutai Kao

(57) ABSTRACT

A method is provided for transmitting wireless signals in a network comprising a network coordinator and one or more remote devices. The available transmission time is divided into a plurality of superframes, each of which is further divided up into a beacon duration, one or more management time slots, one or more guaranteed time slots, and one or more asynchronous time slots. Each of the management time slots, guaranteed time slots, and asynchronous time slots are assigned to one of the one or more remote devices. The network coordinator sends a beacon to the one or more remote devices during the beacon duration. The device or coordinator assigned to the current guaranteed time slot sends frames of isochronous data in the current guaranteed time slot. The device or coordinator assigned to the current asynchronous time slot sends frames of asynchronous data in the current asynchronous time slot.

14 Claims, 13 Drawing Sheets

U.S. PATENT DOCUMENTS

| | | | | |
|---|---|---|---|---|
| 7,133,418 B1* | 11/2006 | Macridis et al. | ............ | 370/468 |
| 2002/0105930 A1* | 8/2002 | Sydon et al. | ............... | 370/337 |
| 2003/0002520 A1* | 1/2003 | Zwack | ...................... | 370/458 |
| 2003/0235161 A1* | 12/2003 | Shoji et al. | ................. | 370/329 |
| 2005/0041632 A1* | 2/2005 | Takahashi | .................. | 370/350 |
| 2005/0190739 A1* | 9/2005 | Sparrell et al. | ............. | 370/347 |
| 2005/0232219 A1* | 10/2005 | Aiello et al. | ............... | 370/348 |
| 2005/0276255 A1* | 12/2005 | Aiello et al. | ............... | 370/348 |
| 2006/0050730 A1* | 3/2006 | Shvodian | ................... | 370/458 |

FOREIGN PATENT DOCUMENTS

| | | |
|---|---|---|
| EP | 0924896 | 6/1999 |
| JP | 2001-77821 | 3/2001 |

OTHER PUBLICATIONS

"3GPP TS 25.211 V3.7.0 (Jun. 2001) 3rd Generation Partnership Project Technical Specification Group Radio Access Network Physical Channels and Mapping of Transport Channels into Physical Channels (FDD)," 3GPP TS 25.211 V3.7.0, XX, XX, vol. 3.7.0, Jun. 2001, pp. 1-45, XP002902457.

Mouly E et al.: "The Radio Interface," GSM System for Mobile Communications, Lassay-Les-Chateaux, Europe Media, FR, pp. 186-259, XP00860004.

Office Communication issued from European Patent Office issued on Oct. 26, 2005 for the corresponding European patent application No. 03 731 977.9-2412.

Gilb, James P.K. "Project: IEEE P802.15 Working Group for Wireless Personal Area Networks (WPANS): Overview of Draft Standard 802.15.3." No. IEEE802.15-01/508r1, Nov. 14, 2001, pp. 1-22.

R. Prasad, W. Mohr, W. Konhauser: "Third Generation Mobile Communications Systems," 2000, Artech House, Boston, London XP002246167.

Notification of the First Office Action dated Jul. 4, 2008 in corresponding Chinese Patent Application No. 03806213.5 (an English translation thereof).

English translation of the Decision of Rejection from the Japanese Patent Office dated Jun. 17, 2009 in the corresponding Japanese Patent Application No. 2003-563168.

* cited by examiner

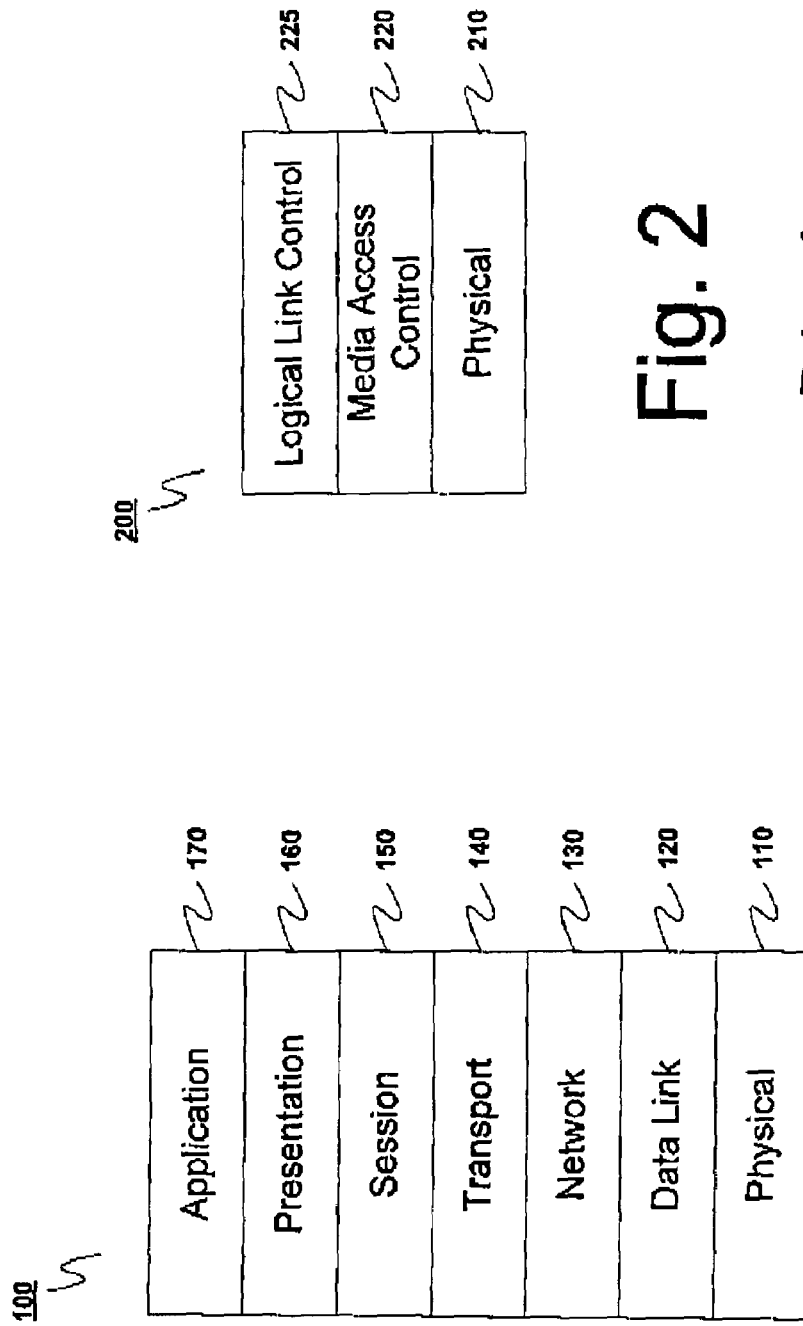

SYSTEM AND METHOD FOR HANDLING ASYNCHRONOUS DATA IN A WIRELESS NETWORK

CROSS-REFERENCE TO RELATED PATENT DOCUMENTS

This application relies for priority on U.S. provisional application Ser. No. 60/349,353, by Knut T. Odman, filed Jan. 22, 2002, entitled "SHORT ASYNCHRONOUS DATA IN MANAGEMENT TIME SLOT," U.S. provisional application Ser. No. 60/349,357, by Knut T. Odman, filed Jan. 22, 2002, entitled "LONG ASYNCHRONOUS DATA IN ASYNCHRONOUS TIME SLOT," and U.S. provisional application Ser. No. 60/349,359, by Knut T. Odman, filed Jan. 22, 2002, entitled "LLC SERVICE ACCESS POINT FOR CONVERGENCE LAYER REPLACING 802.2," the contents of both of which are hereby incorporated by reference in their entirety.

BACKGROUND OF THE INVENTION

The present invention relates to wireless personal area networks and wireless local area networks. More particularly, the present invention relates to how to handle short streams of asynchronous data in an assigned but otherwise unused management time slot, or long streams of asynchronous data in an asynchronous time slot.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 300 that could use the IEEE 802 standard 200. In a preferred embodiment the network 300 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a coordinator (i.e., it functions as a server) while the other devices (sometimes called stations) follow the time allocation instructions of the coordinator (i.e., they function as clients). The coordinator can be a designated device, or simply one of the devices chosen to function as a coordinator. One primary difference between the coordinator and non-coordinator devices is that the coordinator must be able to communicate with all of the devices in the network, while the various non-coordinator devices need not be able to communicate with all of the other non-coordinator devices.

As shown in FIG. 3, the network 300 includes a coordinator 310 and a plurality of non-coordinator devices 320. The coordinator 310 serves to control the operation of the network 300. As noted above, the system of coordinator 310 and non-coordinator devices 320 may be called a piconet, in which case the coordinator 310 may be referred to as a piconet coordinator (PNC). Each of the non-coordinator devices 320 must be connected to the coordinator 310 via primary wireless links 330, and may also be connected to one or more other non-coordinator devices 320 via secondary wireless links 340, also called peer-to-peer links.

In addition, although FIG. 3 shows bi-directional links between devices, they could also be unidirectional. In this case, each bi-directional link 330, 340 could be shown as two unidirectional links, the first going in one direction and the second going in the opposite direction.

In some embodiments the coordinator 310 may be the same sort of device as any of the non-coordinator devices 320, except with the additional functionality for coordinating the system, and the requirement that it communicate with every device 320 in the network 300. In other embodiments the coordinator 310 may be a separate designated control unit that does not function as one of the devices 320.

Through the course if the following disclosure the coordinator 310 will be considered to be a device just like the non-coordinator devices 320. However, alternate embodiments could use a dedicated coordinator 310. Furthermore, individual non-coordinator devices 320 could include the functional elements of a coordinator 310, but not use them, functioning as non-coordinator devices. This could be the case where any device is a potential coordinator 310, but only one actually serves that function in a given network.

Each device of the network 300 may be a different wireless device, for example, a digital still camera, a digital video camera, a personal data assistant (PDA), a digital music player, or other personal wireless device.

The various non-coordinator devices 320 are confined to a usable physical area 350, which is set based on the extent to which the coordinator 310 can successfully communicate with each of the non-coordinator devices 320. Any non-coordinator device 320 that is able to communicate with the coordinator 310 (and vice versa) is within the usable area 350 of the network 300. As noted, however, it is not necessary for every non-coordinator device 320 in the network 300 to communicate with every other non-coordinator device 320.

FIG. 4 is a block diagram of a device 310, 320 from the network 300 of FIG. 3. As shown in FIG. 4, each device (i.e., each coordinator 310 or non-coordinator device 320) includes a physical (PHY) layer 410, a media access control (MAC) layer 420, a set of upper layers 430, and a management entity 440.

The PHY layer 410 communicates with the rest of the network 300 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 430 include the functionality of the device 310, 320. These upper layers 430 may include a logical link control (LLC) or the like. The upper layers allow the MAC layer 420 to interface with various protocols, such as TCP/IP, TCP, UDP, RTP, IP, USB, 1394, UDP/IP, ATM, DV2, MPEG, or the like.

Typically, the coordinator 310 and the non-coordinator devices 320 in a WPAN share the same bandwidth. Accordingly, the coordinator 310 coordinates the sharing of that bandwidth. Standards have been developed to establish protocols for sharing bandwidth in a wireless personal area network (WPAN) setting. For example, the IEEE standard 802.15.3 provides a specification for the PHY layer 410 and the MAC layer 420 in such a setting where bandwidth is shared using a form of time division multiple access (TDMA). Using this standard, the MAC layer 420 defines frames and superframes through which the sharing of the bandwidth by the devices 310, 320 is managed by the coordinator 310 and/or the non-coordinator devices 320.

Preferred embodiments of the present invention will be described below. And while the embodiments described herein will be in the context of a WPAN (or piconet), it should be understood that the present invention also applies to other settings where bandwidth is to be shared among several users, such as, for example, wireless local area networks (WLAN), or any other appropriate wireless network.

The present invention provides a method of coordinating devices 310, 320 either operating in a network 300 or trying to join a network 300 through the use of cyclic beacons inside superframes that define the data path across the network 300.

Device IDs and MAC Addresses

One important aspect of working with devices 310, 320 in a network 300 is uniquely identifying each of the devices 310, 320. There are several ways in which this can be accomplished.

Independent of any network it is in, each device 310, 320 has a unique MAC address that can be used to identify it. This MAC address is generally assigned to the device by the manufacturer such that no two devices 310, 320 have the same MAC address. One set of standards that is used in preferred embodiments of the present invention to govern MAC addresses can be found in IEEE Std. 802-1990, "IEEE Standards for Local and Metropolitan Area Networks: Overview and Architecture."

For ease of operation, the network 300 can also assign a device ID to each device 310, 320 in the network 300 to use in addition its unique MAC address. In the preferred embodiments the MAC 420 uses ad hoc device IDs to identify devices 310, 320. These device IDs can be used, for example, to route frames within the network 300 based on the ad hoc device ID of the destination of the frame. The device IDs are generally much smaller than the MAC addresses for each device 310, 320. In the preferred embodiments the device IDs are 8-bits and the MAC addresses are 48-bits.

Each device 310, 320 should maintain mapping table that maps the correspondence between device IDs and MAC addresses. The table is filled in based on the device ID and MAC address information provided to the non-coordinator devices 320 by the coordinator 310. This allows each device 310, 320 to reference themselves and the other devices in the network 300 by either device ID or MAC address.

The present invention can be used with the IEEE 803.15.3 standard for high-rate WPANs, which is currently under development by the IEEE 802.15 WPAN™ Task Group 3 (TG3). The details of the current draft 802.15.3 standard, including archives of the 802.15.3 working group can be found at: http://wwwieee802.org/15/pub/TG3.html. Nothing in this disclosure should be considered to be incompatible with the draft 802.15.3 standard, as set forth on the IEEE 802 LAN/MAN Standards Committee web page.

Superframes

The available bandwidth in a given network 300 is split up in time by the coordinator 310 into a series of repeated superframes. These superframes define how the available transmission time is split up among various tasks. Individual frames of data are then transferred within these superframes in accordance with the timing set forth in the superframe.

FIG. 5 is a block diagram of a superframe according to preferred embodiments of the present invention. As shown in FIG. 5, each superframe 500 may include a beacon period 510, a contention access period (CAP) 520, and a contention free period (CFP) 530.

The beacon period 510 is set aside for the coordinator 310 to send a beacon frame out to the non-coordinator devices 320 in the network 300. Such a beacon frame will include information for organizing the operation of devices within the superframe. Each non-coordinator device 320 knows how to recognize a beacon 510 prior to joining the network 300, and uses the beacon 510 both to identify an existing network 300 and to coordinate communication within the network 300.

The CAP 520 is used to transmit commands or asynchronous data across the network. The CAP 520 may be eliminated in many embodiments and the system would then pass commands solely during the CFP 530.

The CFP 530 includes a plurality of time slots 540. These time slots 540 are assigned by the coordinator 310 to a single transmitting device 310, 320 and one or more receiving devices 310, 320 for transmission of information between them. Generally each time slot 540 is assigned to a specific transmitter-receiver pair, though in some cases a single transmitter will transmit to multiple receivers at the same time. Exemplary types of time slots are: management time slots (MTS) and guaranteed time slots (GTS).

An MTS is a time slot that is used for transmitting administrative information between the coordinator 310 and one of the non-coordinator devices 320. As such it must have the coordinator 310 be one member of the transmission pair. An MTS may be further defined as an uplink MTS (UMTS) if the coordinator 310 is the receiving device, or a downlink MTS (DMTS) if the coordinator 310 is the transmitting device.

A GTS is a time slot that is used for transmitting isochronous non-administrative data between devices 310, 320 in the network 300. This can include data transmitted between two non-coordinator devices 320, or non-administrative data transmitted between the coordinator 310 and a non-coordinator device 320.

As used in this application, a stream is a communication between a source device and one or more destination devices. The source and destination devices can be any devices 310, 320 in the network 300. For streams to multiple destinations, the destination devices can be all or some of the devices 310, 320 in the network 300.

In some embodiments the uplink MTS may be positioned at the front of the CFP 530 and the downlink MTS positioned at the end of the CFP 530 to give the coordinator 310 a chance to respond to an uplink MTS in the in the downlink MTS of the same superframe 500. However, it is not required that the coordinator 310 respond to a request in the same superframe 500. The coordinator 310 may instead respond in another downlink MTS assigned to that non-coordinator device 320 in a later superframe 500.

The superframe 500 is a fixed time construct that is repeated in time. The specific duration of the superframe 500 is described in the beacon 510. In fact, the beacon 510 generally includes information regarding how often the beacon 510 is repeated, which effectively corresponds to the duration of the superframe 500. The beacon 510 also contains information regarding the network 300, such as the identity of the transmitter and receiver of each time slot 540, and the identity of the coordinator 310.

The system clock for the network 300 is preferably synchronized through the generation and reception of the beacons 510. Each non-coordinator device 320 will store a synchronization point time upon successful reception of a valid beacon 510, and will then use this synchronization point time to adjust its own timing.

Although not shown in FIG. 5, there are preferably guard times interspersed between time slots 540 in a CFP 530. Guard times are used in TDMA systems to prevent two transmissions from overlapping in time because of inevitable errors in clock accuracies and differences in propagation times based on spatial positions.

In a WPAN, the propagation time will generally be insignificant compared to the clock accuracy. Thus the amount of guard time required is preferably based primarily on the clock accuracy and the duration since the previous synchronization event. Such a synchronizing event will generally occur when a non-coordinator device 320 successfully receives a beacon frame from the coordinator 310.

For simplicity, a single guard time value may be used for the entire superframe. The guard time will preferably be placed at the end of each beacon frame, GTS, and MTS.

The exact design of a superframe 500 can vary according to implementation. FIG. 6 shows an example of a specific superframe design. As shown in FIG. 6, the transmission scheme 600 involves dividing the available transmission time into a plurality of superframes 610. Each individual superframe 610 includes a beacon frame 620, an uplink MTS 630, a plurality of GTS 640, and a downlink MTS 650. This exemplary superframe includes no contention access period.

The beacon frame 620 indicates by association ID (known as a device ID in the IEEE 802.15.3 draft standard) a non-coordinator device 320 that is assigned to the current superframe 610. It also indicates via a receive-transmit table the transmitter/receiver assignments for the individual GTS 640.

In the exemplary superframe structure shown in FIG. 6, the uplink MTS 630 is set aside for the non-coordinator device 320 assigned to the current superframe 610 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

The plurality of GTS 640 are the time slots set aside for each of the devices 310, 320 to allow communication between devices. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The downlink MTS 650 is set aside for the coordinator 310 to download signals to the non-coordinator device 320 assigned to the current superframe 610. All other non-coordinator devices 320 may ignore all transmissions during this time slot.

The lengths of the uplink and downlink MTS 630 and 650 must be chosen to handle the largest possible management frame, an immediate acknowledgement (ACK) frame, and the receiver-transmitter turnaround time. The GTS 640, the length and number must be chosen to accommodate the specific requirements of frames to be transmitted, e.g., short MPEG frames, large frames of the maximum allowable length, and the ACK policy used.

Although the disclosed embodiment uses one uplink MTS 630 placed before a plurality of GTS 640, and one downlink MTS 650 placed after a plurality of GTS 640, the number, distribution, and placement of MTS 630, 650 and GTS 640 may be varied in alternate embodiments.

However, such a TDMA protocol in general has no support for asynchronous data. A system is forced to use a static stream connection for the passing of asynchronous data, which leads to a large signal overhead, or to provide an asynchronous period (e.g., a CAP 520) that uses a contention access protocol like carrier sense multiple access/collision avoidance (CSMA/CA), which leads to performance degradation and to power usage increase The power consumption is increased because every device 310, 320 must remain powered up during the CAP 520 (i.e., none of the devices 310, 320 can enter a power-saving sleep mode). The performance is degraded because there is less certainty of a given data frame being transmitted at any given time.

SUMMARY OF THE INVENTION

Consistent with the title of this section, only a brief description of selected features of the present invention is now presented. A more complete description of the present invention is the subject of this entire document.

An object of the present invention is to provide a method for transmitting asynchronous data in a wireless network.

Another object of the present invention is to provide alternate ways to send asynchronous data so that the asynchronous data can be transferred between devices as rapidly as possible.

Another feature of the present invention is to use a priority value assigned to a piece of data to be transmitted to determine whether the device is isochronous or asynchronous data, and to determine under what parameters the data will be transmitted.

These and other objects are accomplished by way of a method of transmitting wireless signals in a network comprising a network coordinator and one or more remote devices, comprising dividing up available transmission time into a plurality of superframes; dividing each of the plurality of superframes into a beacon duration, one or more management time slots, one or more guaranteed time slots, and one or more asynchronous time slots; assigning each management time slot to one of the one or more remote devices; assigning each guaranteed time slot to one of the one or more remote devices or to the network coordinator; assigning each asynchronous time slot to one of the one or more remote devices or to the network coordinator; sending a beacon from the coordinator to the one or more remote devices during the beacon duration of each of the plurality of superframes; sending one or more frames of isochronous data in a current guaranteed time slot from the one or more remote device or network coordinator assigned to the current guaranteed time slot; and sending one or more frames of asynchronous data in a current asynchronous time slot from the one or more remote device or network coordinator assigned to the current asynchronous time slot.

The method may further comprise sending in a current management time slot a management frame from the one of the one or more remote devices assigned to the current management time slot to the network coordinator. The method may further comprise sending in a current management time slot a management frame from the network coordinator to the one of the one or more remote devices assigned to the current management time slot. The method may further comprise sending in a current management time slot a small asynchronous data frame from the one of the one or more remote devices assigned to the current management time slot to another of the one or more devices or the network coordinator.

A guaranteed time period assigned to the one or more guaranteed time slots is preferably greater than an asynchronous time period assigned to the one or more asynchronous time slots.

The one or more management time slots in each superframe preferably includes at least an uplink management time slot for transferring signals between the device assigned to the uplink management time slot and the network coordinator, and a downlink management time slot for transferring signals between the network coordinator and the device assigned to the uplink management time slot.

The method may further comprise sending in a current uplink management time slot a small asynchronous data frame from the one of the one or more remote devices assigned to the current management time slot to another of the one or more devices or the network coordinator.

The beacon duration is preferably formed at the beginning of each of the superframes, and the one or more management time slots are preferably formed directly after the beacon duration.

The wireless signals may be ultrawide bandwidth signals.

BRIEF DESCRIPTION OF THE DRAWINGS

A more complete appreciation of the invention and its many attendant advantages will be readily obtained as it becomes better understood with reference to the following detailed description when considered in connection with the accompanying drawings, in which:

FIG. 1 is a diagram showing the hierarchy of the seven-layered OSI standard;

FIG. 2 is a diagram showing the IEEE 802 standard;

DETAILED DESCRIPTION OF THE PREFERRED EMBODIMENTS

Figure 3:
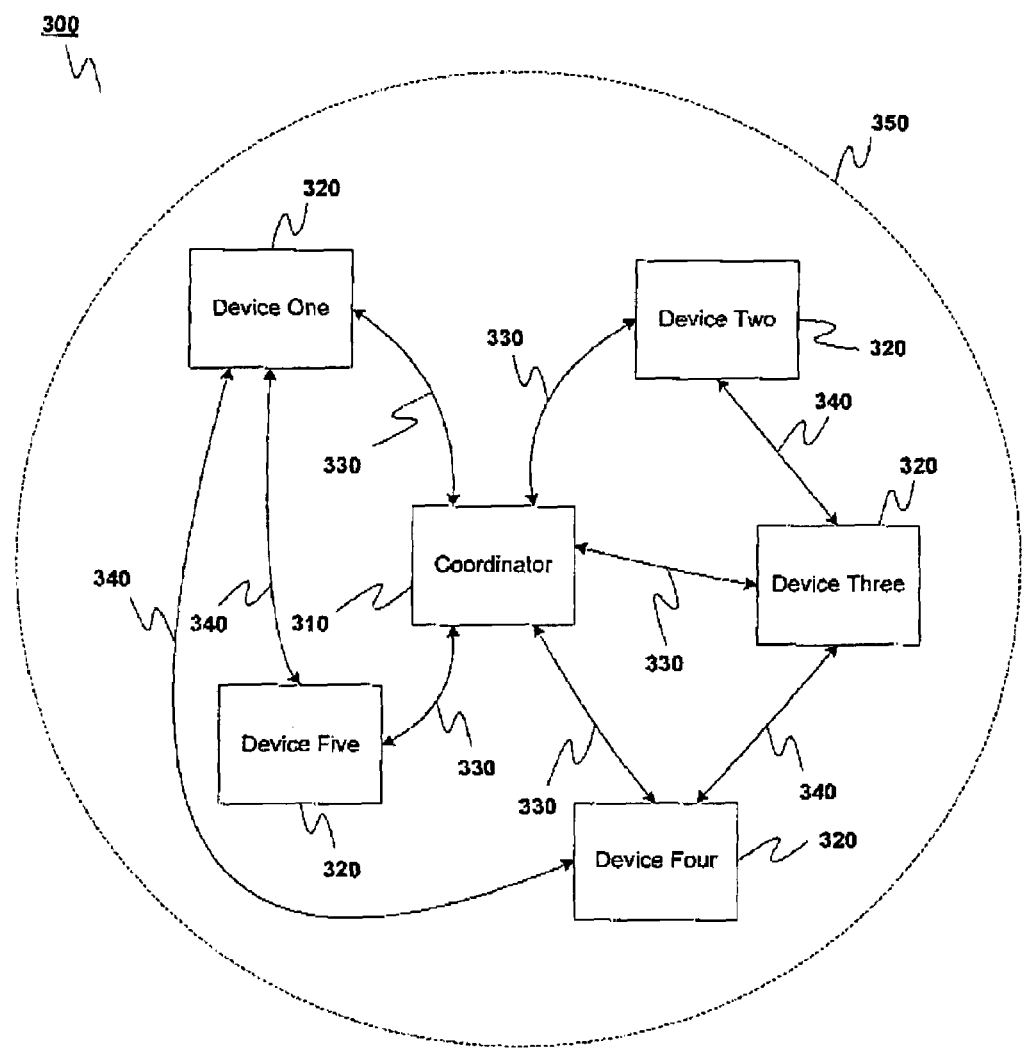
FIG. 3 is a block diagram of a wireless network according to a preferred embodiment of the present invention.

Preferred embodiments of the present invention will now be described with reference to the drawings. Throughout the several views, like reference numerals designate identical or corresponding parts.

Asynchronous and Isochronous Data

In a network there are two kinds of data: asynchronous data and isochronous data. Isochronous data has an assigned bandwidth, the timing of which is guaranteed, at least in the short term. Asynchronous data has no guaranteed bandwidth, and is sent as transmission time becomes available. In operation, asynchronous data transfer has a high level of reliability but no guaranteed delivery time.

The assigned bandwidth for isochronous data is preferably translated into a channel time by the convergence layer in a given device 320, based on current traffic conditions. This convergence layer may be formed in the MAC layer 420 or the upper layers 430. The needed channel time is then requested from the coordinator 310, which grants channel time and is responsible for guaranteeing that the channel time will continue to exist, e.g., by assigning appropriate GTS to the transmitting device 320. The coordinator 310 cannot guarantee bandwidth, however. Preferably the convergence layer monitors and if necessary re-requests channel time.

The reliability of isochronous data can be increased by using acknowledgement and retry attempts.

The assigned bandwidth for asynchronous data is preferably assigned on an as-needed basis. When a device 320 needs to send asynchronous data, it requests channel time from the coordinator 310 for the asynchronous transmission. The coordinator 310 is responsible for guaranteeing the channel time for the asynchronous transmission (e.g., in an asynchronous time slot or a management time slot as shown below), but need not guarantee any continued bandwidth.

The delivery status of asynchronous data can be reported accurately to the convergence layer in a device 310, 320 through the use of an optional acknowledgement (ACK) and a configurable amount of times that the device will retry sending the data if transmission is unsuccessful.

Asynchronous data may be delivered by polling, i.e. the asynchronous data frames may be sent by a non-coordinator device 320 only when the coordinator 310 authorizes transmission of the asynchronous frame by sending the device 320 a poll frame.

Superframe Structure

The method and system in this application discloses an alternate superframe design and a way of managing that superframe design that will allow for an effective handling of asynchronous data.

Figure 7:
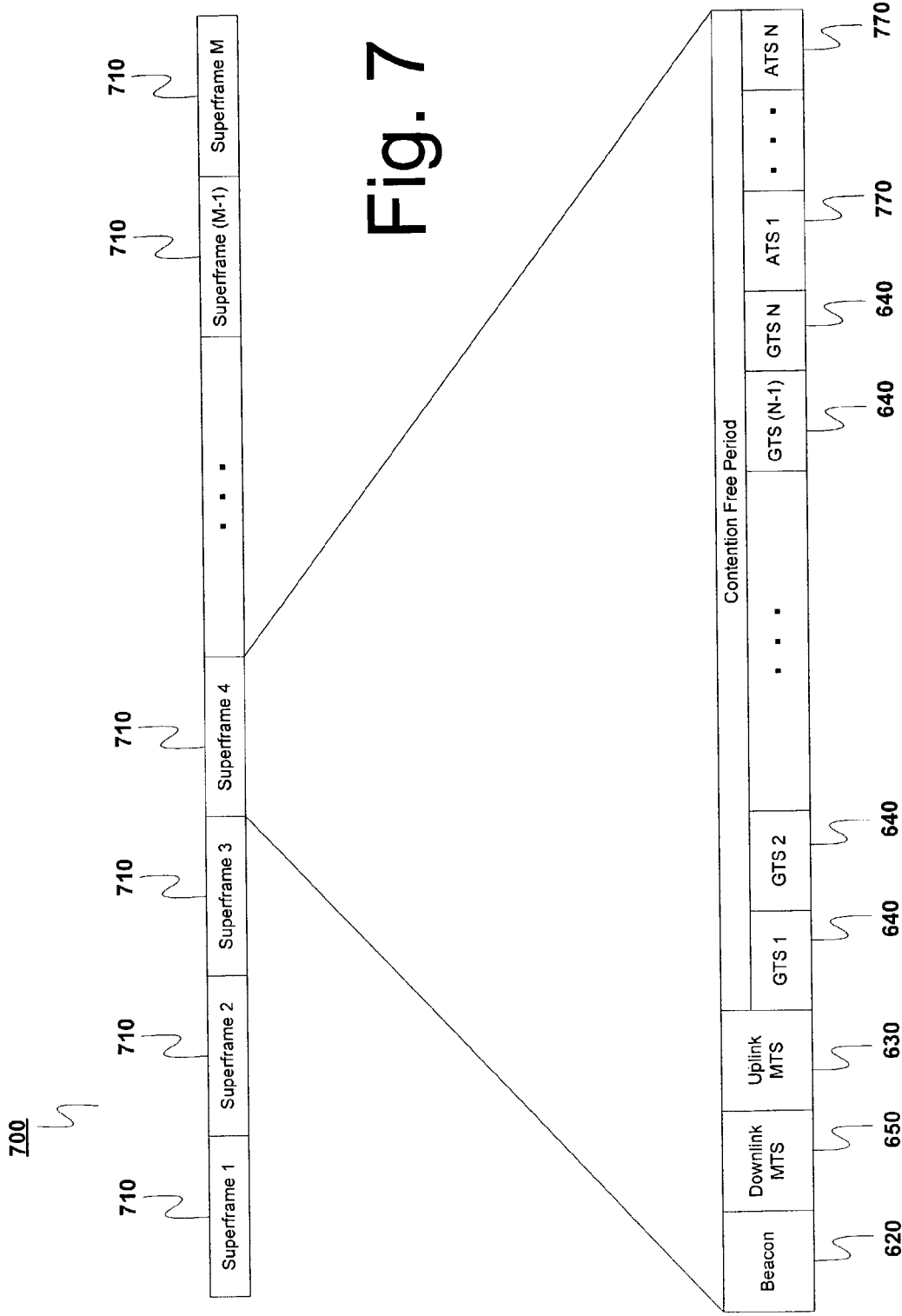
FIG. 7 is a block diagram of a specific superframe design according to a preferred embodiment of the present invention.

FIG. 7 shows an example of a specific superframe design according to a preferred embodiment of the present invention. As shown in FIG. 7, the transmission scheme 700 involves dividing the available transmission time into a plurality of superframes 710. Each individual superframe 710 includes a beacon frame 620, an uplink MTS 630, a downlink MTS 650, a plurality of GTS 640, and a plurality of asynchronous time slots (ATS) 770. This exemplary superframe includes no contention access period 520.

An ATS 770 is a time slot that is used for transmitting asynchronous data between devices 310, 320 in the network 300. This can include data transmitted between two non-coordinator devices 320, non-administrative data transmitted between the coordinator 310 and a non-coordinator device 320, and administrative data transmitted between the coordinator 310 and a non-coordinator device 320 that was too large for an MTS.

By providing one or more asynchronous time slots within a superframe, the system provides a means by which asynchronous data can be passed.

The beacon frame 620 indicates by association ID (known as a device ID in the IEEE 802.15.3 draft standard) a non-coordinator device 320 that is assigned to the current superframe 710. It also indicates via a receive-transmit table the transmitter/receiver assignments for the individual GTS 640. In addition, it indicates the transmitter assignments for any ATS 770 by indicating the device ID and the length and position of the assigned ATS 770. It should be noted, however, that ATS assignments are generally not persistent. In other words, all ATS assignments must be renewed every time a new need for ATS arises. Alternate embodiments can employ default ATS assignments, however, which will remain every superframe.

In an alternate embodiment, a stream index may be added to allow multiple streaming between the same source-destination pair. This can be shown, for example, in the CTA for the draft 802.15.3 standard, which allows for such multiple streaming.

In the embodiment shown in FIG. 7, the uplink MTS 630 is set aside for the non-coordinator device 320 assigned to the current superframe 710 to upload signals to the coordinator 310. All other non-coordinator devices 320 remain silent on the current channel during this time slot. In alternate embodiments that use multiple channels, all other stations on that channel must remain silent during an uplink MTS 630, though they may still transmit on alternate channels.

In this embodiment, the uplink and downlink MTS 630, 650 are be placed in front of the CFP 530. However, in alternate embodiments, the number, distribution, and placement of MTS 630, 650 and GTS 640 may be varied.

The plurality of GTS 640 are the time slots set aside for each of the devices 310, 320 to pass isochronous data between each other. They do so in accordance with the information set forth in the receive-transmit table in the beacon 620. Each GTS 640 is preferably large enough to transmit one or more data frames. When a transmitter-receiver set is assigned multiple GTS 640, they are preferably contiguous.

The plurality of ATS 770 are the time slots set aside for each of the devices 310, 320 to pass asynchronous data between each other. They are preferably assigned just as are GTS, except that ATS assignments are not persistent. In addition, each device preferably maintains a single queue for all asynchronous data that it needs to transmit. The coordinator 310 assigns ATS 770 to the devices 310, 320 based solely on the contents of this queue.

The uplink MTS 630 is generally set aside for the non-coordinator device 320 assigned to the current superframe. 710 upload signals to the coordinator 310, or to send smaller asynchronous data frames to other non-coordinator devices 320. In some embodiments, non-coordinator devices 320 that are guaranteed to receive no data frames during an MTS may ignore all transmissions during this time slot. In other embodiments, all devices will listen during every uplink MTS 630.

The downlink MTS 650 is generally set aside for the coordinator 310 to download signals to the non-coordinator device 320 assigned to the current superframe 710. In some alternate embodiments, if not needed for management data, a downlink MTS 650 can be used by the coordinator 310 to send smaller asynchronous data frames to other non-coordinator devices 320. In some embodiments, non-coordinator devices 320 that are guaranteed to receive no data frames during an MTS may ignore all transmissions during this time slot. In other embodiments, all devices will listen during a downlink MTS 650.

The length of the superframe 710 is fixed, and is preferably chosen to have a duration between 10 and 30 ms in order to minimize the data buffering requirements.

The lengths of the uplink and downlink MTS 630 and 650 must be chosen to handle the largest possible management frame, an immediate acknowledgement (ACK) frame, and the receiver-transmitter turnaround time. For the GTS 640, the length and number must be chosen to accommodate the specific requirements of frames to be transmitted, e.g., short MPEG frames, large frames of the maximum allowable length, and streaming vs. immediate ACK operation. For the ATS 770, the length, number, and assignment are preferably determined as with the assignment of MTS, except that when making a request for ATS, a device 310 passes to the coordinator 310 the total transmission time required to send all of the contents of its asynchronous transmit queue, and the minimum length of an acceptable ATS 770. The coordinator 310 then assigns ATS 770 accordingly.

Although the disclosed embodiment uses a plurality of GTS 640, a plurality of ATS 770, one uplink MTS 630 placed before the GTS 640, and one downlink MTS 650 placed after the ATS 770, the number, distribution, and placement of GTS 640, ATS 770, and MTS 630, 650 may be varied in alternate embodiments.

In this embodiment the management time slots (MTS) are for management frames and high priority asynchronous data frames under 256 bytes, the guaranteed time slots (GTS) are for medium priority isochronous data, and the asynchronous time slots (ATS) are for asynchronous low priority data and high priority asynchronous data over 255 bytes.

Short and Long Asynchronous Data Frames

In the embodiment disclosed in FIG. 7, there are two kinds of asynchronous data frames: short asynchronous frames and long asynchronous frames.

A short asynchronous frame is one that is small enough to be sent in an MTS in place of a management frame. In a preferred embodiment, a short asynchronous frame has a maximum size of 255 bytes. However, this size can vary depending upon the size of the MTS in a particular embodiment.

A long asynchronous frame is one that is larger than a short asynchronous frame, up to a maximum long asynchronous frame size. In the preferred embodiment a long asynchronous frame can vary in size from 255 bytes up to an MTS maximum set by the protocol (e.g., ~2000 bytes in some embodiments). However, the minimum long asynchronous frame size can vary according to the maximum short asynchronous frame size; and the maximum long asynchronous frame size can vary according to the chosen transmission parameters of the current protocol. Asynchronous data is preferably limited in size to keep it from overwhelming the available air time.

In operation, a non-coordinating device 320 can send a short asynchronous frame instead of a management packet during any upstream MTS assigned to it. Similarly, in alternate embodiments, the coordinator 310 may send a small asynchronous frame during any downlink MTS.

If the current protocol requires all devices 310, 320 to listen to all MTS, then the device, then the device 310, 320 assigned to the current MTS (a non-coordinator device 320 in an uplink MTS and a coordinator 310 in a downlink MTS) can send its short asynchronous frame to any other device. If non-coordinator devices 320 are allowed to go to sleep during MTS, then it will be necessary for the coordinator to give other devices 320 some advanced warning that they will be the recipient of a short asynchronous frame in a specific MTS.

Since MTS are always assigned to a specific non-coordinator device 320, that assignment can be regarded as an implicit poll to the device for transmission of short asynchronous frame.

As used in this application, the term "short asynchronous frame" will refer to a valid asynchronous frame of a size small enough to be sent in an MTS, and the term "long asynchronous frame" will refer to a valid asynchronous frame of a size too large to be sent in an MTS. The term "MTS-data frame" will refer to a short asynchronous frame sent during an MTS, and the term "ATS-data frame" will refer to either a short or a long asynchronous data frame sent during an ATS.

Thus, a long asynchronous frame may only be sent in an ATS (as an ATS-data frame), while a short asynchronous frame may be sent either in an MTS (as an MTS-data frame) or during an ATS (as an ATS-data frame).

Coordinating the Transfer of Asynchronous Data

The following disclosure relates to the transfer of asynchronous data. Isochronous data is preferably sent using a conventional transfer mode.

Figure 8:
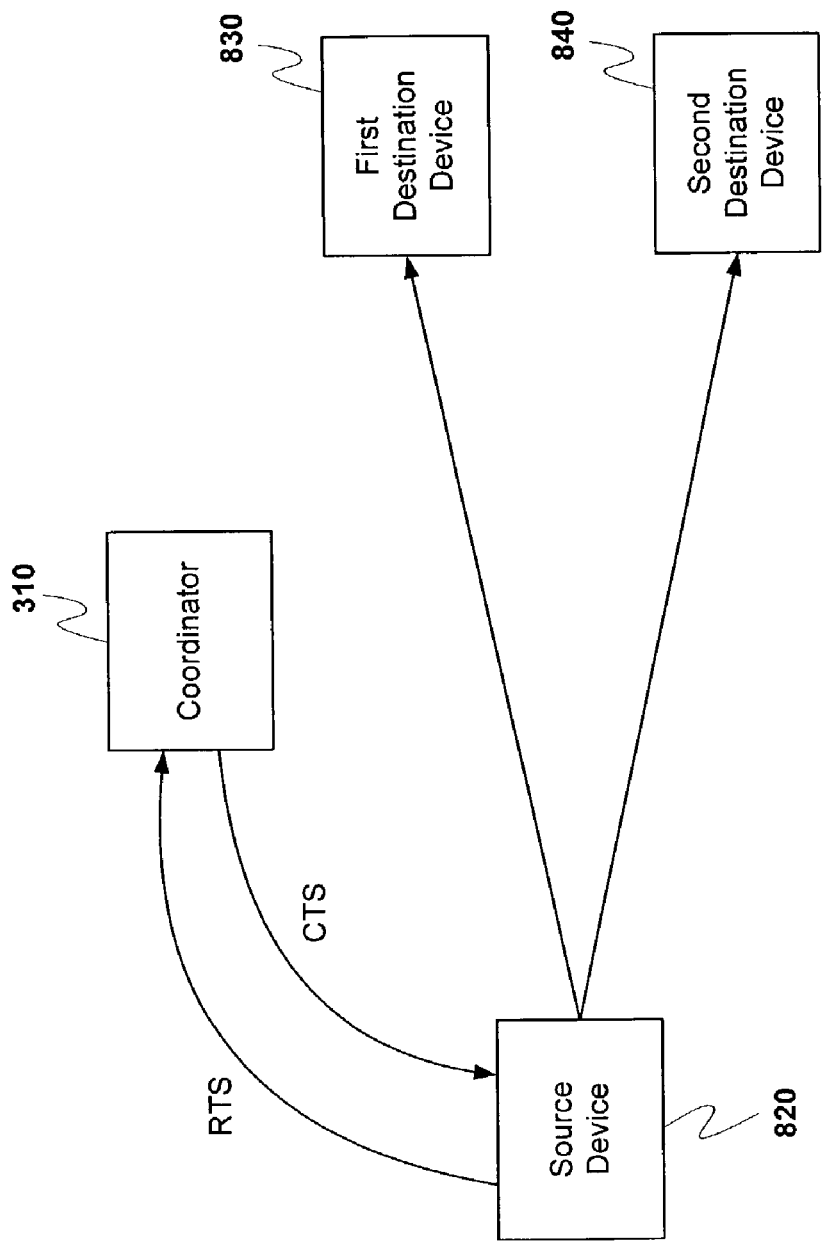
FIG. 8 is a block diagram showing the data connections for a source device sending data to one or more destination devices in a network according to a preferred embodiment of the present invention.

FIG. 8 is a block diagram showing the data connections for a source device sending data to one or more destination devices in a network according to a preferred embodiment of the present invention. As shown in FIG. 8, the system includes a coordinator 310, a source device 820, and first and second destination devices 830 and 840. In this example, the source device 820 can send data to either one or two destination devices 830, 840. The source device 820 and the destination devices 830 and 840 are preferably non-coordinator devices 320 as described above with respect to FIG. 3.

Although in FIG. 8 one device is shown as a source device 820 and two devices are shown as destination devices 830, 840, this is exemplary only. In a preferred network devices will freely change from being source and destination devices as needed, and a given device will continually change its role as data is transmitted through the network. FIG. 8 simply shows a snapshot where one device is a source device 820 and two others are destination devices 830, 840.

Figure 4:
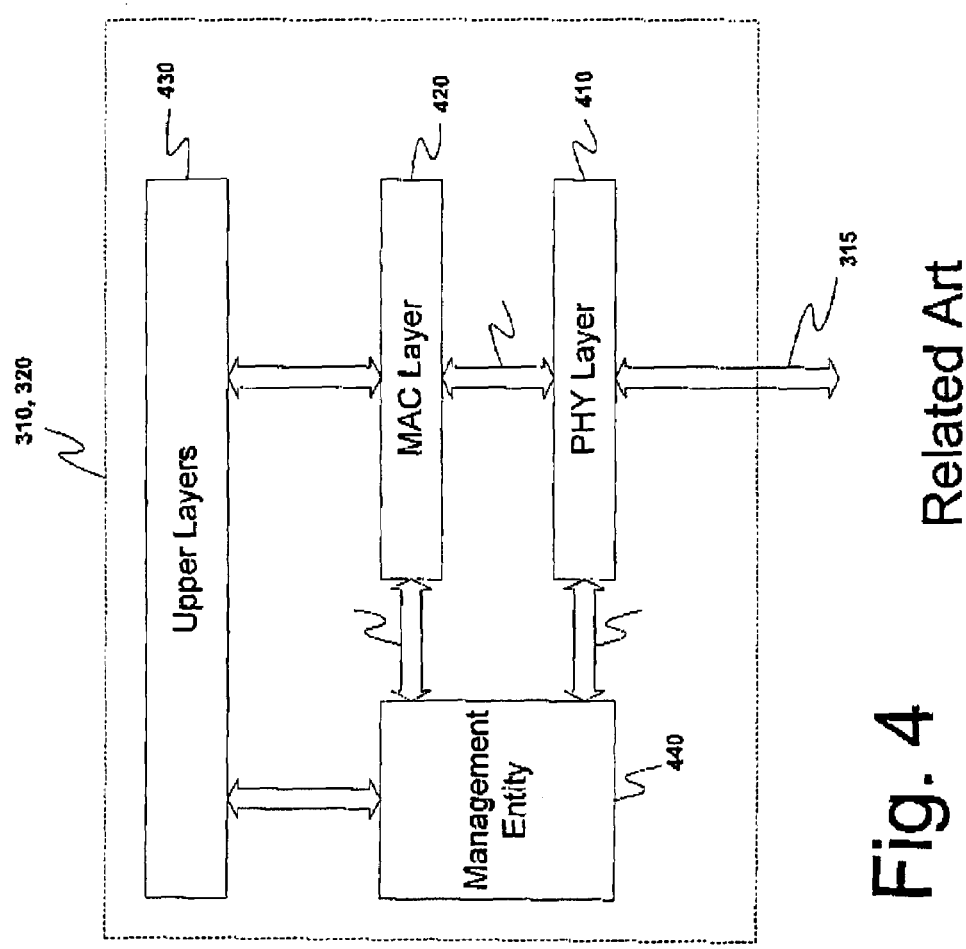
FIG. 4 is a block diagram of a device from the network of FIG. 3.
Figure 5:
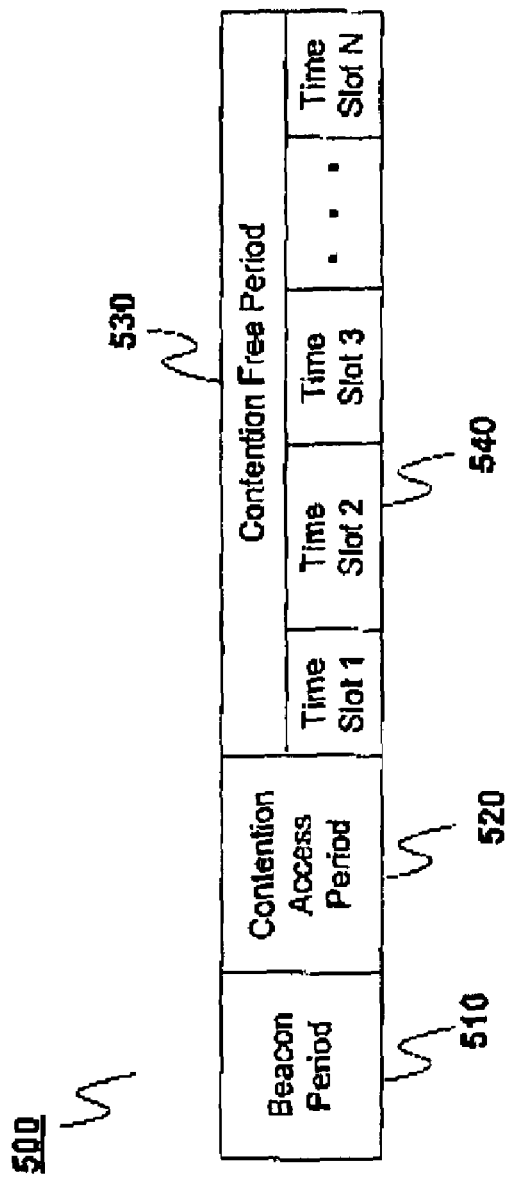
FIG. 5 is a block diagram of a superframe according to preferred embodiments of the present invention.
Figure 6:
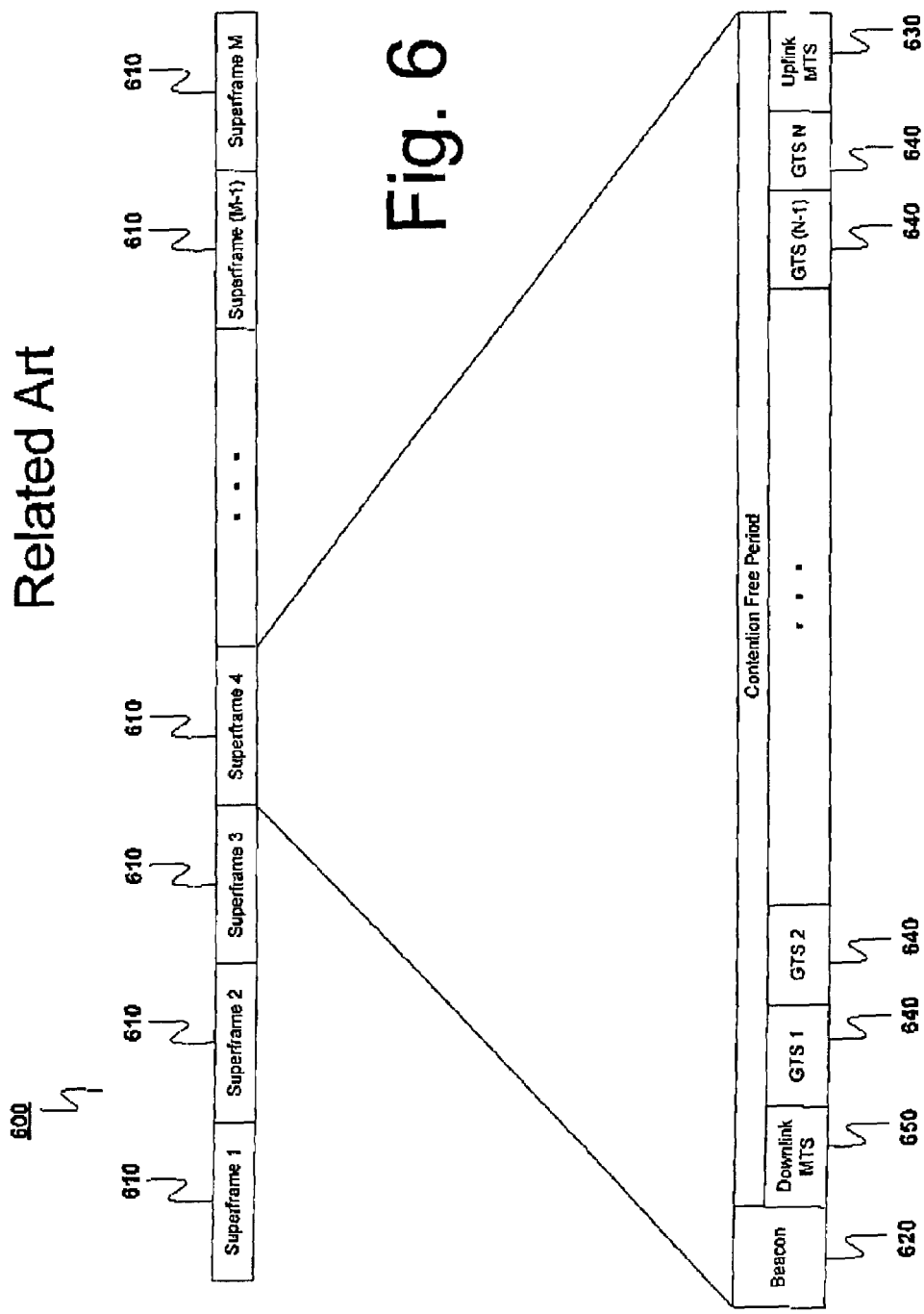
FIG. 6 is a block diagram of a specific superframe design according to a preferred embodiment of the present invention.
Figure 9:
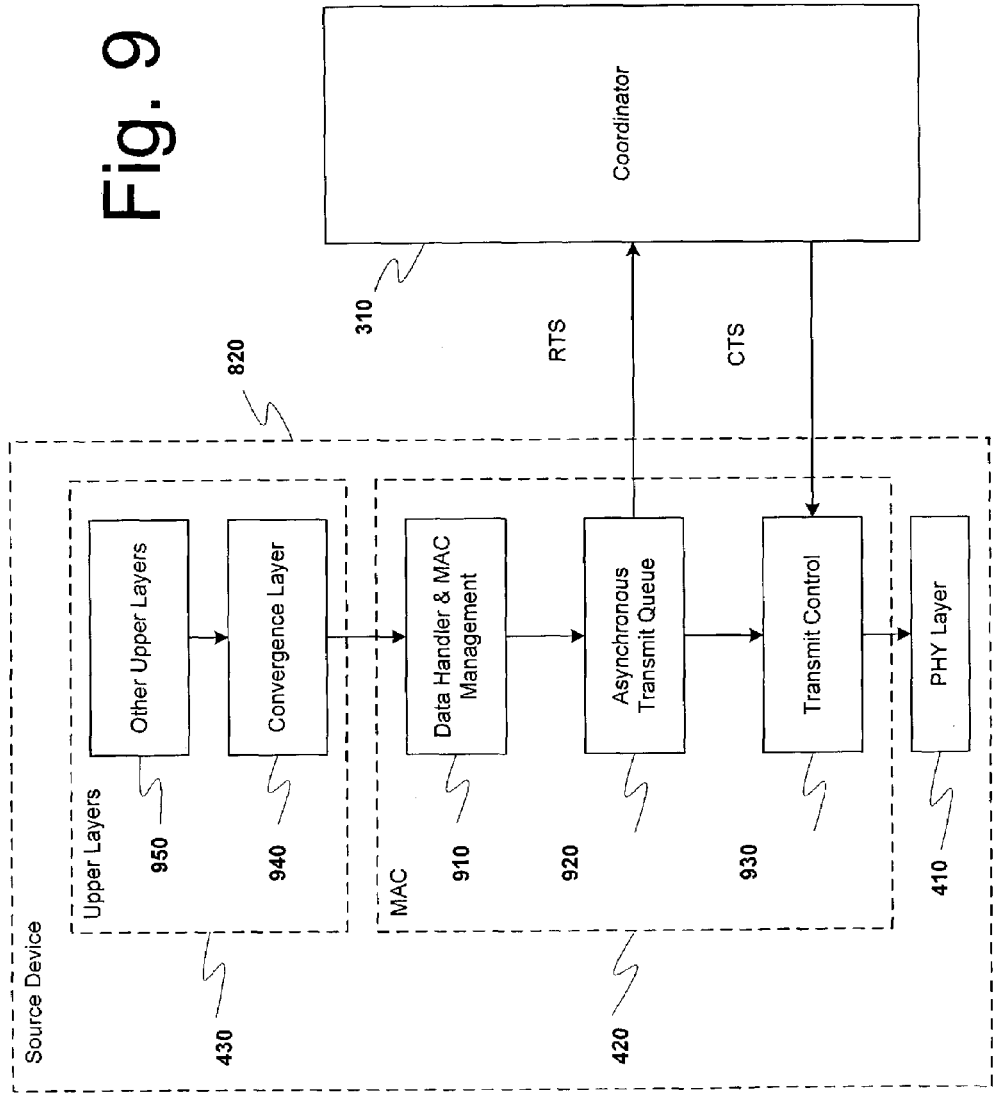
FIG. 9 is a block diagram showing a more detailed description of source device of FIG. 8.

FIG. 9 shows a more detailed description of source device of FIG. 8. As shown in FIG. 9, the source device includes a PHY layer 410, a MAC layer 420, and upper layers 430. (See FIG. 4.) The MAC layer 420 includes a data handler and MAC management layer 910, an asynchronous transmit queue 920, and a transmit control layer 930; and the upper layers 430 include a convergence layer 940 and other upper layers 950. Although the convergence layer 940 is shown as being a part of the upper layers 430, it could also be formed in the MAC layer 420.

The convergence layer 940 preferably contains a fragmenter and operates to calculate the needed channel time for a given device with respect to frame size, rate, acknowledgement policy and estimated amount of retries (if retries are used). In alternate embodiments the fragmenter could be located in the MAC layer 420, e.g., in the data handler and MAC management layer 910.

The data handler 910 preferably performs a conversion of addresses from a MAC address to a device ID according to the data transmission rules.

The asynchronous transmit queue 920 is preferably a push-pull queue for data and management frames, and may contain a frame builder for filling in header data or the like.

The transmit control layer 930 is responsible for determining the right time to send a certain frame. Appropriate time plan or transmission stimulus comes from the coordinator 310.

A line labeled "RTS" (request to send) is shown coming from the asynchronous transmit queue 920 of the source device 820 to the coordinator 310. The RTS is a pseudo notation of the device asking the coordinator for permission to send date (e.g., through a poll request, a channel time request, etc.). Although shown as coming from the asynchronous transmit queue 920 directly to the coordinator 310, the RTS actually passes through the PHY layer 410 as well.

A line labeled "CTS" (clear to send) is shown coming from the coordinator 310 to the transmit control 930 of the source device 820. The CTS is a pseudo notation of the coordinator granting permission to send (e.g., through a poll, a beacon CTA, etc.). Although shown as coming from the coordinator 310 directly to the transmit controller 930, the CTS actually passes through the PHY layer 410 as well Referring to FIGS. 8 and 9, in operation, the coordinator 310 either allocates channel time and/or polls the devices 820, 830, 840 in the network. (In other embodiments the network could include greater than two devices, making for a more complicated polling/CTA process.) In addition, the convergence layer 940 of the device 320 must know the channel time needed; the asynchronous transmit queue 920 must know the current amount of unsent frames (new frames or old frames that have previously failed transmission); and the transmit controller 930 must know the time to send the data.

Therefore, the asynchronous transmit queue 920 must begin by initiating an RTS and providing the coordinator 310 with the current queue status (e.g., how many frames are in the queue, to whom must they be sent, the channel time allocation). The trigger for the asynchronous transmit queue 920 to send the RTS signal is preferably a new data entry in the asynchronous transmit queue 920, since the asynchronous queue 920 has no way of knowing when a frame can be sent, nor how many frames it will be allowed to send next time.

The transmit controller 930 must interpret the CTS message received from the coordinator 310 and pull the appropriate frame(s) out of the asynchronous transmit queue 920. It must provide the asynchronous transmit queue 920 with enough information to select the right frame(s) for transmission. The transmit controller 930 has no way of knowing how many frames there are in the asynchronous queue 920, and how many of them match the current CTS received from the coordinator 310. If there is no matching frame, the asynchronous transmit queue 920 must inform the transmit controller 930 that there's nothing to send.

In some cases a requesting device might never receive a suitable CTA. Therefore, the transmit queue 920 must have a self-cleaning function whereby data frames that are too old get purged from the transmit queue 920. One example of this kind of self-cleaning function is the aging function provided in the 802.11 standard. To enable an aging function such as this, every frame must be tagged with a transmit timeout value. The transmit queue 920 will then periodically cycle through all frames that are not yet sent to see if any of the frames have been waiting longer than their transmit timeout value allows. In such a case the frames fail and are removed from the queue 920.

One reason a frame might not have been sent could be either that the destination device 830, 840 never acknowledged it or that the coordinator 310 never provided a chance to send it.

Priority

Data frames may also be given a priority code (indicating the priority of the data transmission) by other upper layers 950 than the convergence layer 940. This data and priority code is then preferably passed to the convergence layer 940, which uses that information to elect the appropriate MAC services for the data. In the present invention, as disclosed in its preferred embodiments, the convergence layer 940 uses the priority codes to determine the type of the data frame (asynchronous or isochronous) that the MAC layer 420 should use for transmitting the data.

The IEEE 802 standard (e.g., the 802.1 and 802.15.3 protocols) offers eight possible priority codes, 0-7. In the preferred embodiment, seven of these codes are used. As shown in Table 1, the preferred embodiment used these priority codes to determine both the priority of the data, and the kind of delivery service the MAC layer 420 should use for the data frames it creates.

TABLE 1

| Priority | Traffic Type | Data Type | ACK Policy | Retry Policy |
|---|---|---|---|---|
| 0 (Default) | Best Effort (BE) | Asynchronous. | Always use ACK. | Use maximum number of retry attempts. |
| 1 | Background (BK) | Asynchronous. | Set ACK policy based on the service used. | Use up to maximum retry attempts if ACK policy is set to yes, and no retry of ACK policy is set to no. |
| 2 | Not used | Not used | Not used | Not used. |
| 3 | Excellent Effort (EE) | Isochronous | Not determined by priority value. | Not determined by priority value. |
| 4 | Controlled Load (CL) | Isochronous | Not determined by priority value. | Not determined by priority value. |
| 5 | Video (VI) | Isochronous | Not determined by priority value. | Not determined by priority value. |
| 6 | Voice (VO) | Isochronous | Not determined by priority value. | Not determined by priority value. |
| 7 | Network Control (NC) | Asynchronous. | Not determined by priority value. | Not determined by priority value. |

In the preferred embodiment priorities 0, 1, and 7 are used for asynchronous data, priorities 3, 4, 5, and 6 are used for isochronous data, and priority 2 is not used.

For data with a priority of 0 (Best Effort), the convergence layer 940 should instruct the MAC layer 420 to transmit the data as asynchronous data and to set the ACK policy to yes (i.e., requiring an acknowledgement), and to use the maximum number of allowed retry attempts.

For data with a priority of 1 (Background), the convergence layer 940 should instruct the MAC layer 420 to transmit the data as asynchronous data and to set the ACK policy based on the service used—yes or no, as required. If the ACK policy is set to no (i.e., requiring no acknowledgement), the MAC layer 420 should set the number of retries to zero. If the ACK policy is set to yes (i.e., requiring an acknowledgement), the MAC layer 420 should set the number of retries to a number up to the maximum number of allowed retries. Preferably, however, the number of retries will be set to a number lower than the maximum.

For data with priorities 3, 4, 5, or 6 (Excellent Effort, Controlled Load, Video, or Voice), the convergence layer 940 should instruct the MAC layer 420 to transmit the data as isochronous data. In the preferred embodiment the ACK policy and the retry policy are not determined by the priority setting for these priorities.

For data with a priority 7 (Network Control), the convergence layer 940 should instruct the MAC layer 420 to transmit the data as asynchronous data. In the preferred embodiment the ACK policy and the retry policy are not determined by the priority setting for this priority.

In operation, the convergence layer 940 will receive a primitive, i.e., a message, from a higher layer that passes some data to be sent. The convergence layer 940 then selects the appropriate MAC services for the data based of priority value contained in the primitive it receives (as defined in Table 1). For example, if it receives asynchronous data with a priority of 0, it will set the ACK policy in the MAC to require acknowledgement, and will sent the number of MAC retries to be the maximum allowed.

If the convergence layer 940 receives a primitive with inappropriate priority parameters, it will either send a confirm signal with a failure message (if a confirm signal is possible), or reassign the priority to either 0 (Best Effort) for asynchronous data, or 3 (Excellent Effort) for isochronous data.

Comparison of Channel Time Allocation and Polling

The following is a brief comparison of channel time allocation and polling for dividing transmission time for asynchronous data in a network. Although these examples show the transmission of only two asynchronous data frames, the procedures they show can be extended to apply to queues of higher numbers of asynchronous data frames.

Channel Time Allocation

Figure 10:
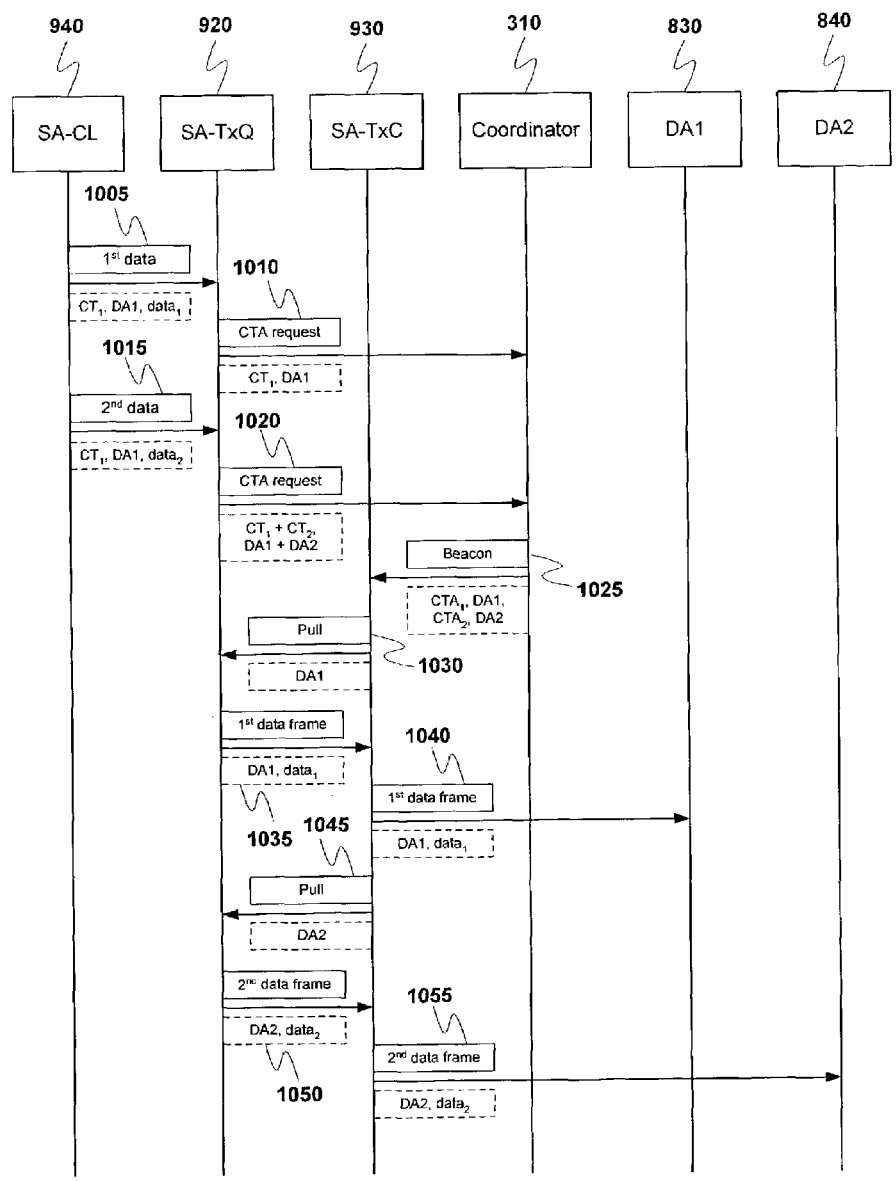
FIG. 10 is a message sequence chart that describes how two data frames are sent to two different destination devices using channel time allocation according to a preferred embodiment of the present invention.

FIG. 10 is a message sequence chart that describes how two data frames are sent to two different destination devices using channel time allocation according to a preferred embodiment of the present invention. As shown in FIG. 10, there are six elements involved in this communication: the convergence layer of the source device (SA CL) 940, the asynchronous transmit queue of the source device (SA-TxQ) 920, the transmit controller of the source device (SA-TxC) 930, the coordinator 310, a first destination device (reference by the first destination address—DA1) 830, and a second destination device (reference by the second destination address—DA2) 840.

As shown in FIG. 10, the convergence layer 940 starts by queuing a first piece of data to the source device asynchronous transmit queue 920. (Step 1005) The convergence layer 940 passes the first data, the address of the destination device (DA1 in this case), and the required channel time $CT_1$. The source device asynchronous transmit queue 920 then sends a channel time allocation (CTA) request to the coordinator 310 including the destination address DA1 and the required channel time $CT_1$. (Step 1010) This corresponds to the RTS in FIG. 8.

The convergence layer 940 then queues a second piece of data to the source device asynchronous transmit queue 920. (Step 1015) The convergence layer 940 passes a new set of data, the address of the destination device (DA2 in this case), and the required channel time $CT_2$ of this new data. The source device asynchronous transmit queue 920 then sends a new CTA request to the coordinator 310 to take the place of the old one. This new CTA request provides a new snapshot of the status of the source device asynchronous transfer queue 920, and includes both destination addresses DA1 and DA2, and the total required channel time $CT_1+CT_2$. (Step 1020) In alternate embodiments the beacon could include a CTA and destination address ($CTA_1$ and DA1) relating to the first CTA request, and a separate CTA and destination address ($CTA_2$ and DA2) relating to the second CTA request. In either embodiment, this corresponds to the RTS in FIG. 8.

Having received the two CTA requests in steps 1010 and 1020, the coordinator 310 sends a beacon to the transmit controller 930 of the source device. (Step 1025) The beacon includes a total allocated CTA (in this case $CT_1+CT_2$, which grants enough time to send both data frames), and destination addresses relating to both CTA requests (DA1 and DA2).

The transmit controller 930 of the source device then issues a pull command to the asynchronous transmit queue 920 requesting the first data to be transmitted to the first destination device 830. (Step 1030) The asynchronous transmit queue 920 then sends the first data and first destination address DA1 to the transmit controller 930 so that they can be passed on to the PHY layer 410 for transmission. (Step 1035) And the transmit controller 930 then processes the first data and first destination address DA1 such that they are sent onward to the first destination device 830. (Step 1040)

Since after sending the first data frame there is still enough allocated CTA to send the second data frame, the transmit controller 930 of the source device then issues a pull command to the asynchronous transmit queue 920 requesting the second data to be transmitted to the second destination device 840. (Step 1045) The asynchronous transmit queue 920 then sends the second data and second destination address DA2 to the transmit controller 930 so that they can be passed on to the PHY layer 410 for transmission. (Step 1050) And the transmit controller 930 then processes the second data and second destination address DA2 such that they are sent onward to the second destination device 840. (Step 1055)

Figure 11:
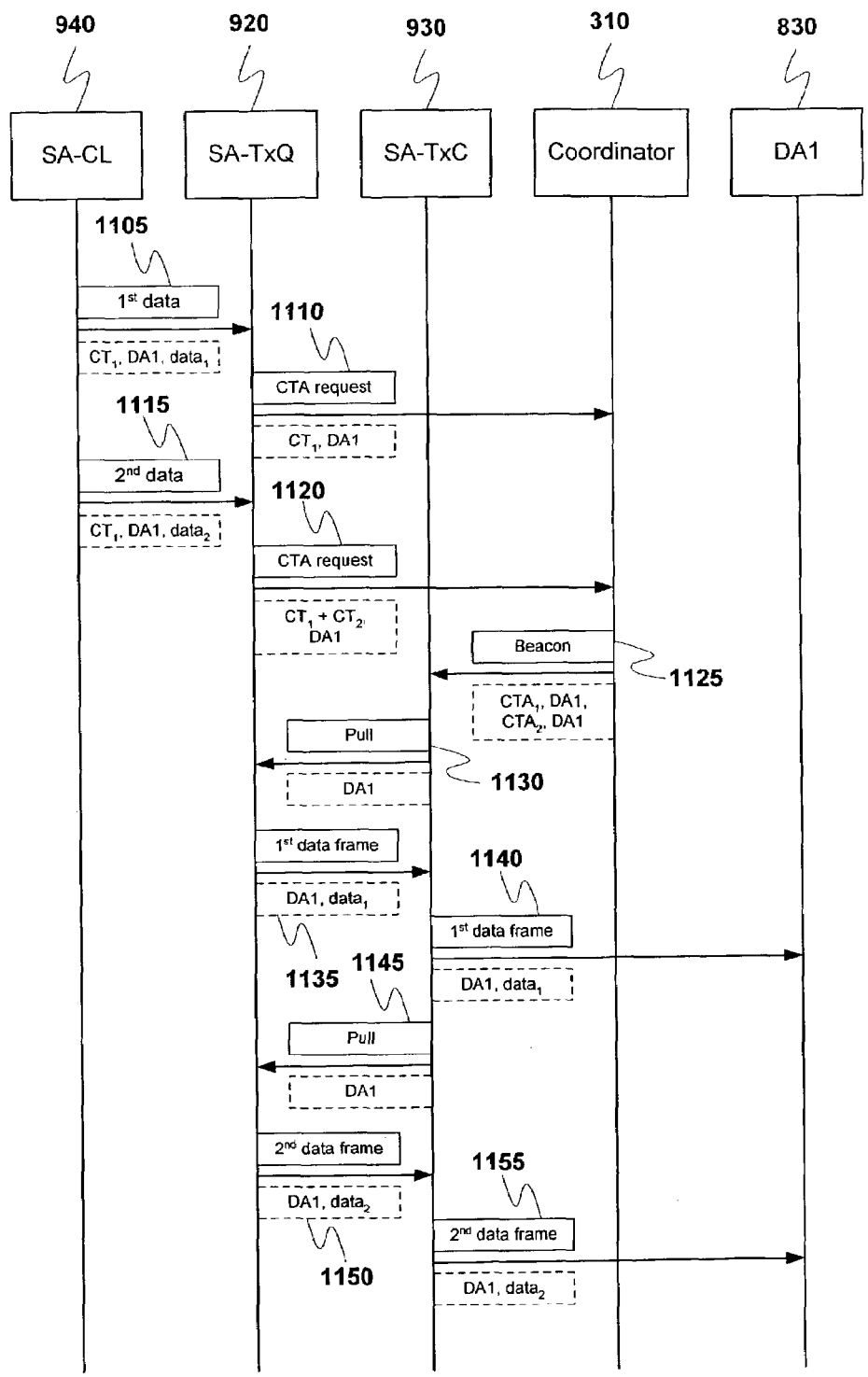
FIG. 11 is a message sequence chart that describes how two data frames are sent to a single destination device using channel time allocation according to a preferred embodiment of the present invention.

FIG. 11 is a message sequence chart that describes how two data frames are sent to a single destination device using channel time allocation according to a preferred embodiment of the present invention. As shown in FIG. 11, there are five elements involved in this communication: the convergence layer of the source device (SA CL) 940, the asynchronous transmit queue of the source device (SA-TxQ) 920, the transmit controller of the source device (SA-TxC) 930, the controller 310, and a first destination device (reference by the first destination address—DA1) 830.

As shown in FIG. 11, the convergence layer 940 starts by queuing a first piece of data to the source device asynchronous transmit queue 920. (Step 1105) The convergence layer 920 passes the first data, the address of the destination device (DA1 in this case), and the required channel time $CT_1$. The source device asynchronous transmit queue 920 then sends a channel time allocation (CTA) request to the coordinator 310 including the first destination address DA1 and the required channel time $CT_1$. (Step 1110)

The convergence layer 910 then queues a second piece of data to the source device asynchronous transmit queue 920. (Step 1115) The convergence layer 920 passes the second data, the address of the destination device (DA1 in this case), and the required channel time $CT_2$. The source device asynchronous transmit queue 920 then sends a new CTA request to the coordinator 310 to replace the old CTA request, offering a new snapshot of the contents of the source device asynchronous transmit queue 920. This new CTA request includes the first destination address DA1 and the new total required channel time $CT_1+CT_2$. (Step 1120)

Having received the two CTA requests in steps 1110 and 1120, the coordinator 310 sends a beacon to the transmit controller 930 of the source device. (Step 1125) This beacon includes a destination address relating to the first and second CTA request (DA1), and a CTA relating to the sum of the first and second CTA requests ($CTA_1+CTA_2$). In alternate embodiments the beacon could include a CTA and destination address ($CTA_1$ and DA1) relating to the first CTA request, and a separate CTA and destination address ($CTA_2$ and DA1) relating to the second CTA request.

The transmit controller 930 of the source device then issues a pull command to the asynchronous transmit queue 920 requesting the first data to be transmitted to the first destination device 830. (Step 1130) The asynchronous transmit queue 920 then sends the first data and first destination address DA1 to the transmit controller 930 so that they can be passed on to the PHY layer 410 for transmission. (Step 1135) And the transmit controller 930 then processes the first data and first destination address DA such that they are sent onward to the first destination device 830. (Step 1140)

The transmit controller 930 of the source device then issues a pull command to the asynchronous transmit queue 920 requesting the second data to be transmitted to the first destination device 830. (Step 1145) The asynchronous transmit queue 920 then sends the second data and first destination address DA1 to the transmit controller 930 so that they can be passed on to the PHY layer 410 for transmission. (Step 1150) And the transmit controller 930 then processes the second data and first destination address DA1 such that they are sent onward to the first destination device 830. (Step 1155)

In both of these examples, two separate requests are made and then two separate allocations are made by the coordinator 310. Furthermore, the second data frame is queued before the source device transmit controller 930 receives the CTA in the beacon. The coordinator 310 allocates two CTAs in the beacon, and the transmit controller 930 fetches twice from the asynchronous transmit queue 920 using the respective destination addresses as identifiers.

Furthermore, in this embodiment the required channel time ($CT_1$, $CT_2$) must be calculated so that the asynchronous transmit queue 920 can pass that information along in the CTA request. An alternate scheme has all asynchronous CTA set to a predefined size. In that case the asynchronous transmit queue 920 only need ask for an allocation for the amount of entries in the queue to a certain destination device. Although this alternative will be somewhat wasteful of bandwidth, it simplifies implementation considerably.

Deallocation Techniques

Regardless of the destination, after the frames are sent, the CTA needs to be deallocated for a given device. There are several possible schemes provided for deallocation.

Using a first alternative, the system could set every allocation to be valid for one superframe. Using this scheme, CTA will automatically be deallocated after each superframe. This is a very simple implementation from the transmit side, but a problem occurs when a frame is not acknowledged (ACKed).

The problem is that the unacknowledged frame may be severely delayed in being transmitted. Generally the only thing that triggers a new request for CTA is a frame entering the asynchronous transmit queue 920. If a frame is unacknowledged and then its CTA is automatically deallocated at the end of the frame, it could be stuck in the queue 920 until a new frame is entered.

In such a scheme, the asynchronous transmit queue 920 cannot spontaneously send new CT-requests, since it doesn't know when to send them. The asynchronous transmit queue 920 can't simply reissue a CT-request every time a frame is not acknowledged, however, since it doesn't know how many frames there are in the queue for the same DA, nor does it know if the unacknowledged frame will be purged from the asynchronous transmit queue 920 due to the operation of an aging function in the asynchronous transmit queue 920.

Using a second alternative, every allocation could be valid for N superframes, where N is an integer greater than one. Using this scheme, CTA will automatically be deallocated after N superframes.

Preferably N is selected to a reasonable number corresponding to the maximum number of transmission retries in the network. This solves the problems in the first alternative, but adds to the complexity of the coordinator 310. Under this scheme the coordinator 310 would need to have separate counters for every CTA, and would need to have every CT-request tagged so that it could determine if a new CT-request refers in whole or in part to an existing CTA.

Using a third alternative, every allocation can be valid for a certain time period. Using this scheme, CTA will automatically be deallocated after the time period is ended.

This offers the advantage of simplicity of concept, but adds additional implementation difficulties in synchronizing between a requesting device and the coordinator 310. In addition, the coordinator 310 would need to have separate timers for every CTA, and would need to have every CT-request tagged so that it could determine if a new CT-request refers in whole or in part to an existing CTA.

Using a fourth alternative, every allocation could last forever. In this case the requesting device is responsible for freeing the CTA when it no longer has any traffic. Under one preferred embodiment, every time the transmit controller 930 has a CTA for a certain destination device, and the asynchronous transmit queue 920 reports that it has no frames for that destination device, the transmit controller 930 of the source device must send a CTA-free message using the destination device's address as the identifier.

This works well at the cost of increased traffic, since CTA freeing has to be done per destination device. The biggest cost is that transmit controller 930 must send a new frame for every CTA that is not needed. It cannot combine several free messages into one, since it must pull frames out of the queue individually for every CTA (one or more times) and free them as they are not needed. The transmit controller 930 cannot queue up requests since it's strictly a real-time handler of the TDMA protocol that needs to process events as they occur. In other words, it cannot use non-deterministic processing.

Using a fifth alternative, every allocation request is valid until it is allocated once. Thus, when a device makes a request of the coordinator 310, the request will stay valid until the coordinator 310 supplies what was requested (e.g., channel time, requested information, etc.) The exact number of superframes that it takes to supply what was requested is unimportant. The allocation request remains valid until the request is answered, even what was requested takes multiple superframes to supply (e.g., channel time spread out over multiple superframes).

Preferably, however, a timeout period is provided to set a maximum length that the allocation request can remain valid. In this case, if what was requested is not provided by the end of the timeout period, the allocation request will end and will be considered a failure. This is useful primarily for asynchronous data, which does not generally have repeated need for channel time.

If a deallocation request is used, there is also the possibility of a race condition. In such a situation, the transmit controller 930 could free a CTA just as a new frame for the same destination device enters the asynchronous transmit queue 920. The only way to prevent this is for the coordinator 310 to always keep one CTA allocated for every source device. The preferred method of implementing this is to have the coordinator 310 allocate a CTA time unit between 1 and a maximum value for each device, always keeping 1 CTA time unit, even if the CTA is freed by the source device.

Although any of these five alternatives can be used, the fifth alternative is most preferable.

Polling

Under a polling scheme, each source device 820 only transmits when it is polled by the coordinator 310. Although an RTS is still sent, the CTS comes in the form of a poll, rather than in the form of a CTA.

There are three main differences between polling and channel requests. First, polling is not constrained by the destination device 830, 840; when a source device 820 is polled it can send data to any device. Second, polling has no deterministic transmission time. As a result, there are very few options for effective power saving. The coordinator 310 may transmit poll-lists in the beacon to limit but it may not eliminate unnecessary wake times. Third, the coordinator 310 must always follow all traffic during the polling time.

There are two preferred ways for scheduling polling by the coordinator 310: each source device 820 can send a poll request for every new frame entered into the asynchronous transmit queue 920; or (2) the coordinator 310 could poll every pollable potential source device according to a coordinator-based polling algorithm.

For reasons similar to those given above for CTA, a given poll must be valid until the message is sent, and the coordinator must respond to a polling request eventually with a poll. Preferably an aging function will purge frames from the asynchronous transmit queue 920 that could not properly get sent. And the transmit controller 930 preferably pulls the first message out of the transmit queue when a poll arrives.

Figure 12:
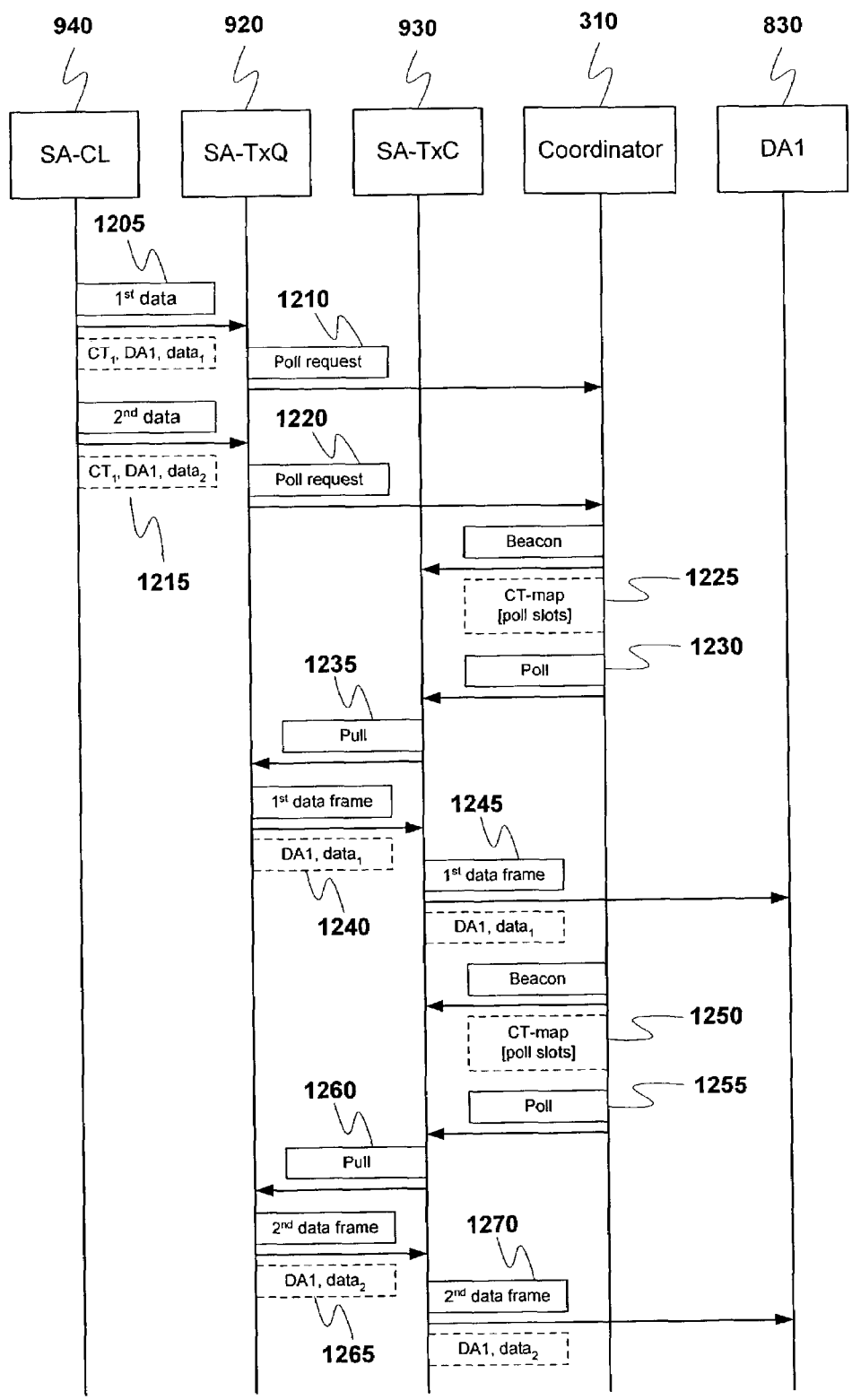
FIG. 12 is a message sequence chart that describes how two data frames are sent to a single destination device using polling according to a first preferred embodiment of the present invention.

FIG. 12 is a message sequence chart that describes how two data frames are sent to a single destination device using polling according to a first preferred embodiment of the present invention. As shown in FIG. 12, there are five elements involved in this communication: the convergence layer of the source device (SA CL) 940, the transmit queue of the source device (SA-TxQ) 920, the transmit controller of the source device (SA-TxC) 930, the controller 310, and a first destination device (reference by the first destination address—DA1) 830.

As shown in FIG. 12, the convergence layer 940 starts by queuing a first piece of data to the source device asynchronous transmit queue 920. (Step 1205) The convergence layer 920 passes the first data, the address of the destination device (DA1 in this case), and the required channel time $CT_1$. The source device asynchronous transmit queue 920 then sends a polling request to the coordinator 310. (Step 1210) This poll request need include no additional information.

The convergence layer 910 then queues a second piece of data to the source device asynchronous transmit queue 920. (Step 1215) The convergence layer 920 passes the second data, the address of the destination device (DA1 in this case), and the required channel time $CT_2$. The source device asynchronous transmit queue 920 then sends a polling request to the coordinator 310. (Step 1220) This poll request need include no additional information.

Having received the two CTA requests in steps 1210 and 1220, the coordinator 310 sends a beacon to the transmit controller 930 of the source device. (Step 1225) The beacon may include a channel time map including the polling slots for the current superframe.

The coordinator 310 then issues a polling command to the transmit controller 930 of the source device. (Step 1230) This polling command need include no additional information since the source device 820 is not limited in any way as to whom it may transmit to. In response to this polling command, the transmit controller 930 of the source device then issues a pull command to the asynchronous transmit queue 920 requesting the first data to be transmitted to the first destination device 830. (Step 1235) As with the polling command, the pull command need include no additional information, since the source device 820 is not limited in any way as to whom it may transmit.

The asynchronous transmit queue 920 then sends the first data and first destination address DA1 to the transmit controller 930 so that they can be passed on to the PHY layer 410 for transmission. (Step 1240) And the transmit controller 930 then processes the first data and first destination address DA such that they are sent onward to the first destination device 830. (Step 1245)

At the next superframe, the coordinator 310 sends a new beacon to the transmit controller 930 of the source device. (Step 1250) The beacon may include a channel time map including the polling slots for the current superframe.

The coordinator 310 then issues another polling command to the transmit controller 930 of the source device. (Step 1255) This polling command need include no additional information, since the source device 820 is not limited in any way as to whom it may transmit to. In response to this polling command, the transmit controller 930 of the source device then issues a pull command to the asynchronous transmit queue 920 requesting the second data to be transmitted to the first destination device 830. (Step 1260) As with the polling command, the pull command need include no additional information since the source device 820 is not limited in any way as to whom it may transmit.

The asynchronous transmit queue 920 then sends the first data and first destination address DA1 to the transmit controller 930 so that they can be passed on to the PHY layer 410 for transmission. (Step 1265) And the transmit controller 930 then processes the second data and first destination address DA such that they are sent onward to the first destination device 830. (Step 1270)

Figure 13:
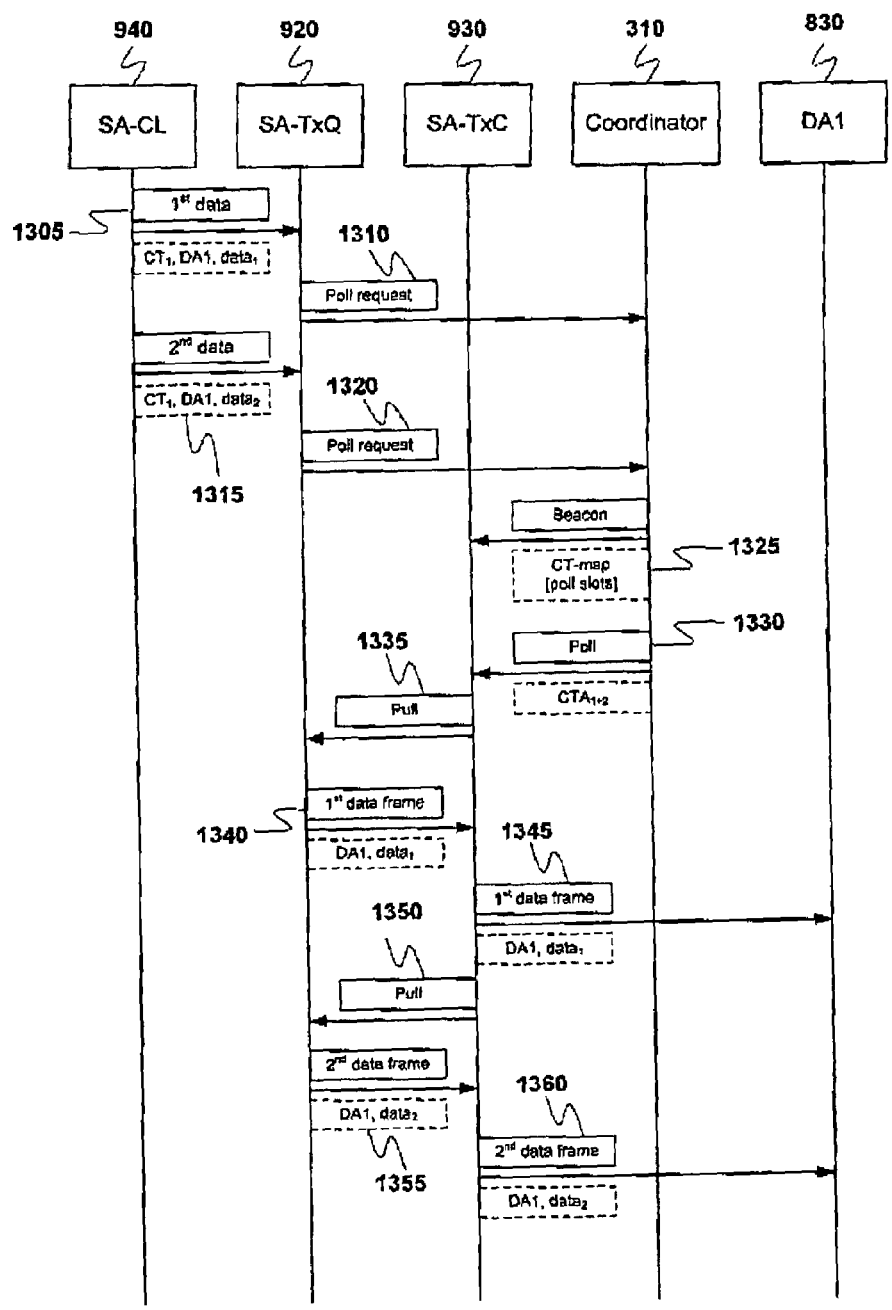
FIG. 13 is a message sequence chart that describes how two data frames are sent to a single destination device using polling according to a second preferred embodiment of the present invention.

FIG. 13 is a message sequence chart that describes how two data frames are sent to a single destination device using polling according to a second preferred embodiment of the present invention. As shown in FIG. 13, there are five elements involved in this communication: the convergence layer of the source device (SA CL) 940, the transmit queue of the source device (SA-TxQ) 920, the transmit controller of the source device (SA-TxC) 930, the controller 310, and a first destination device (reference by the first destination address—DA1) 830.

As shown in FIG. 13, the convergence layer 940 starts by queuing a first piece of data to the source device asynchronous transmit queue 920. (Step 1305) The convergence layer 920 passes the first data, the address of the destination device (DA1 in this case), and the required channel time $CT_1$. The source device asynchronous transmit queue 920 then sends a polling request to the coordinator 310 including the required channel time $CT_1$. (Step 1310)

The convergence layer 910 then queues a second piece of data to the source device asynchronous transmit queue 920. (Step 1315) The convergence layer 920 passes the second data, the address of the destination device (DA1 in this case), and the required channel time $CT_2$. The source device asynchronous transmit queue 920 then sends a polling request to the coordinator 310 including the required channel time $CT_2$. (Step 1320)

Having received the two CTA requests in steps 1310 and 1320, the coordinator 310 sends a beacon to the transmit controller 930 of the source device. (Step 1325) The beacon may include a channel time map including the polling slots for the current superframe.

The coordinator 310 then issues a polling command to the transmit controller 930 of the source device. (Step 1330) This polling command includes channel time information $CTA_{1+2}$ for the data requests made by the source device. In response to this polling command, the transmit controller 930 of the source device then issues a pull command to the asynchronous transmit queue 920 requesting the first data to be transmitted to the first destination device 830. (Step 1335)

The asynchronous transmit queue 920 then sends the first data and first destination address DA1 to the transmit controller 930 so that they can be passed on to the PHY layer 410 for transmission. (Step 1340) And the transmit controller 930 then processes the first data and first destination address DA such that they are sent onward to the first destination device 830. (Step 1345)

If there is still time left during the current superframe (and the coordinator 310 will know this prior to sending the beacon since the source device sent the required channel times $CT_1$ and $CT_2$ with the poll requests) the transmit controller 930 of the source device can issue another pull command to the asynchronous transmit queue 920 requesting the first data to be transmitted to the first destination device 830. (Step 1350)

The asynchronous transmit queue 920 then sends the second data and first destination address DA1 to the transmit controller 930 so that they can be passed on to the PHY layer 410 for transmission. (Step 1355) And the transmit controller 930 then processes the second data and first destination address DA such that they are sent onward to the first destination device 830. (Step 1360)

In this embodiment the coordinator 310 can use more effective polling because the source device 820 initiates the polling request and so can pass a required channel time parameter to the coordinator 310. As a result, this approach allows the source device 820 to send several frames, so long as time remains in the poll.

The coordinator 310 must add all outstanding poll requests and the source device 820 must make sure that the queue 920 is sorted in the same order as the poll requests were sent. And since the coordinator 310 must follow all traffic in polling, it can count down the used time for all frames that have been acknowledged.

In these embodiments freeing is not needed. However, the source device 820 may send a frame indicating that it no longer needs to be on a poll list, should it be polled with an empty queue.

If polling with a request to join a polling queue is used for transferring asynchronous data, (See, e.g., FIGS. 12 and 13 and related disclosure deallocation can be performed by a device by sending a request to be taken off of the polling list.

Using an algorithmic poll instead of polling requests leaves the responsibility to the coordinator 310 to poll all associated devices that have declared themselves pollable. However, since there is no poll requesting, the coordinator 310 has no way of knowing who is the destination device for a given frame, nor does it know the transmission time. As a result, there is no possibility to implement certain power saving methods that require advance notice of an upcoming data frame.

In addition, the coordinator 310 must maintain a table of pollable associated devices and poll them according to a fair algorithm. Also, the maximum used channel time for a given device is preferably limited by a set rule, since a polled station could keep transmitting indefinitely if no limit is in place.

All polling puts a lot of work on the coordinator 310. In addition, receivers must follow all traffic during the polling period to see when it's time for the next poll. If a poll request is used it simplifies the coordinator's work somewhat, since it can simply queue up requests and need not maintain a poll list.

Poll requests also allow a certain amount of power saving capability. The requester could announce its intended destination device and the coordinator could then announce the destination device during a poll period. Then any device that is guaranteed not to be a destination device can enter a sleep mode for the duration of the poll period.

Algorithmic polling has the smallest amount of traffic overhead of all algorithms, but it complicates the implementation of the coordinator the most.

Polling simplifies the queuing and transmission implementation, since only one queue is used. In contrast CTA uses one queue per destination device. This queue may be sorted according to priority if that is supported.

Implementation Problems With CTA and Polling

It can be hard for the asynchronous transmit queue 920 of the source device and the coordinator 310 to maintain and recalculate necessary CTA as the traffic flows.

One solution is to let all source devices request CTA by simply telling the coordinator 310 how many frames are currently in the asynchronous transmit queue 920, regardless of size or destination. The coordinator can then divide time fairly based on need.

The asynchronous transmit queue 920 can also get extremely complicated when there is a destination device scheme for asynchronous data and a stream oriented scheme for isochronous data. In the worst case a device may end up supporting an extremely large number of data queues as it tries to monitor each scheme properly.

One alternate solution is to stop dividing time allocations according to asynchronous and isochronous data. When authorized to send data, the source device 820 can send to any destination device 830, 840 so long as it has transmission time left. In some embodiments the source device 820 may optimize its transmission by sorting its queue in order of destination device. Streams will still be handled in separate queues, but there will preferably be only one asynchronous queue. Although this alternative can be used, it forces all devices 310, 320 to constantly listen, which is costly in terms of power usage.

If a polling scheme is used, the coordinator 310 must have its receiver built to handle traffic snooping, i.e., to check if a frame with the acknowledgement policy bit set is actually acknowledged, and to quickly assemble a new poll message once a burst is done. This can be inefficient in some situations, e.g., for an ultrawide bandwidth system.

One solution is to use a simplified CTA scheme using polling and no destination device queue separation.

In some circumstances a CTA can be freed by transmit controller 930 at the same time as the asynchronous transmit queue 920 gets a new data frame. This can cause delays in the new data being transmitted.

One solution is to give every associated pollable station a minimum CTA time (corresponding to one default size frame). This scheme will in fact correspond to an algorithmic poll, under which each pollable station is assigned a fair amount of CTA time—in this case one default frame when it has indicated that it has no transmissions.

In order to allow certain devices to enter a power save mode it is necessary to know the destination devices and channel times for the various transmissions. Thus, power save can't be performed if this information is not passed to the coordinator 310.

The solution is to drop hard power save requirements for asynchronous data. If a device is asleep during an ATS 770, higher layers can send a short data frame during an MTS 630, 650, when the device will be awake, to tell it to wake up during future ATS 770.

Formation and Allocation of ATS

For asynchronous data frames, the superframe will contain one or more AST 770. In preferred embodiments, the coordinator 310 will maintain minimum and maximum times for ATS in each superframe. All superframe time that is not used for GTS 640, MTS 630, 650, or the beacon 620 is available for ATS 770 up to the maximum ATS time. In addition, a minimum ATS time is preferably maintained. These minimum and maximum values help ensure that available ATS 770 will always be of a useful length, but will not overwhelm the available channel time.

In an alternate embodiment, ATS 770 need not necessarily exist in every superframe if there is little asynchronous traffic. In such an embodiment a guaranteed ATS 770 will only appear in periodic superframes. The periodicity can be varied either statically or dynamically depending upon the relative occurrence of asynchronous traffic.

In another alternate embodiment the coordinator 310 can announce all of the devices that may be receivers of data during an ATS 770. This will allow all devices that are not potential data receivers in the ATS 770 to enter into a power saving mode.

If CTA is used, there is a need for deallocation. CTA-requests must be freed when the message has been sent in order to keep the system from clogging up. If the coordinator 310 is not snooping traffic it cannot determine when a frame is successfully sent and must depend upon being told that the transmitter is completed.

One solution is that every time the transmit queue gets a new asynchronous data frame, and there is already one in the queue, it should send a CT-request to the coordinator 310 giving the current amount of frames in the queue as parameter. If default CTA are used, however, and there is only the new frame being queued, the default single CTA will take care of that one frame.

Every time the transmit controller 930 reports a frame as successfully sent to the asynchronous transmit queue 920, or the asynchronous transmit queue 920 purges a frame due to aging, the asynchronous transmit queue 920 shall issue a new CT-request indicating the current number of entries in the queue 920, so long as the current amount of entries in the queue is greater than zero (or greater than one if the default CTA is used). A higher discrepancy tolerance may be set to reduce the amount of CT-request frames being sent, but at the cost of wasting more bandwidth. However, in alternate embodiments the price in bandwidth may be worth it.

In alternate embodiments the coordinator 310 may optimize transmission and not give every device a default CTA in every superframe. However, each device should be allocated default CTAs with a fair frequency.

Frames are preferably not removed from the queue unto they are either successfully sent, they reach the maximum number of retries, or their maximum age in the queue is reached.

Preferably channel time request frames will be acknowledged by the coordinator 310. If not, the device can simply repeat the request.

Asynchronous Time Slots

Returning to FIG. 7, a preferred embodiment of the present invention, uses a plurality of asynchronous time slots (ATS) 770 in each superframe 710. The amount of time allocated to ATS 770 is simply that amount of time left over in the superframe 710 after the time for the beacon 620, for any MTS 630, 650, and for any GTS 640.

It is preferable that the amount of time in a given superframe allocated for ATS be constrained to be within set minimum and maximum values, regardless of how many or how few asynchronous frames must be transmitted. The minimum value is to make certain that some time in the superframe will be allocated for asynchronous traffic. The maximum value is to make certain that the superframe is not dominated by asynchronous traffic.

The coordinator 310 preferably allocates the available ATS to various source devices (i.e., devices that have sent the coordinator 310 a channel time request) according to the number of frames each has currently to be in their respective queues. If nothing is reported in a CT-request, a default status is implied. In the default status, each device that has not asked for channel time will be given a set minimum CTA for ATS. The minimum ATS CTA is the smallest effective unit of CTA within a superframe.

In alternate embodiments the coordinator 310 could assign the minimum ATS CTA to a non-requesting device less often than every superframe 710. For example, the coordinator 310 could allocate a minimum ATS CTA once every third superframe. However, a non-requesting device should be periodically granted a minimum ATS CTA.

Consider the following examples: a network 300 has three devices 320 that could transmit. The first of the devices 320 sends no information regarding its queue (i.e., it has either one or zero entries in it); the second of the devices 320 sends information to the coordinator 310 indicating that it has four entries in its transmit queue; and the third of the devices 320 sends information to the coordinator 310 indicating that it has two entries in its transmit queue The channel time allocation for each device 320 will be calculated according to the following equation:

$$CTA_i = \frac{q_i}{\sum_{k=1}^{N} q_k} \cdot ATS_T \quad (1)$$

where $CTA_i$ is the channel time allocation for the $i^{th}$ device, $q_i$ is the number of entries in the $i^{th}$ transmit queue, and $ATS_T$ is the total available ATS time, and where $q_i$ has a minimum value of 1.

The minimum value of 1 for $q_i$ allows for a default $CTA_i$ equal to one fractional CTA unit for units that don't request channel time. This default channel time allocation acts as a sort of algorithmic polling, ensuring that each device 320 is periodically polled. However, it requires no additional circuitry to determine how the polling will be done beyond what it takes to assign the default value of 1 to $q_i$.

Based on Equation (1), the channel allocation times for the three devices are as follows:

$$CTA_1 = \frac{1}{1+4+2} \cdot ATS_T$$
$$= \frac{1}{7} \cdot ATS_T$$

$$CTA_2 = \frac{4}{1+4+2} \cdot ATS_T$$
$$= \frac{4}{7} \cdot ATS_T$$

$$CTA_3 = \frac{2}{1+4+2} \cdot ATS_T$$
$$= \frac{2}{7} \cdot ATS_T$$

The total available ATS time ATST is preferably divided such that the assigned fraction can never be smaller that is needed for a maximum frame size at a default transmission rate, with acknowledgement. If based on the calculation of Equation (1), the fractional allocations of this available time ATST should become any smaller than the required minimum, the coordinator 310 will remove some devices from allocation. These devices can then be allocated time in a subsequent beacon, i.e., a later superframe, since they will get none in the current beacon (superframe). This assures that an excessively large frame will not get stuck in the queue.

Preferably, the coordinator 310 will indicate to all possible destination addresses that they should remain awake and listening during the CTA in which their traffic may be sent. By using this sort of overlapping CTA, the network 300 allows all devices that are guaranteed not to receive any transmissions to go into a power-saving sleep mode, while forcing awake only those devices that need to be awake.

In an alternate embodiment, the actual CTA sent to the source device will include the allocated time and offset, the address of the source device (i.e., the transmitting device), and will pass a destination address set to the broadcast ID. The destination address parameter is sent as the broadcast ID since the actual destination address is unknown. The source device is free to send data to any device during its ATS CTA, and need not inform the coordinator 310 of whom it will be speaking to.

Preferably, if a device has frames in its queue, but get no CTA in the current frame (e.g., because there were too many devices requesting channel time), it will not repeat the CT-request. The coordinator 310 has received its initial CT-request and will continue to process it. There is no need to repeat the request, though in some embodiments a new request could be made.

One reason for using relative allocation of the available channel time $CTA_T$ is so that a device with several small frames in its queue will not get a disproportionably larger CTA than a device with only a few large frames. Once it receives its CTA, a device 320 will always have enough time to send at least one frame of any size (up to a set maximum) from its queue. Of course, in embodiments that allow the transmission of multiple frames, the device 320 might be able to send multiple frames within the CTA, if the frames are small enough.

In some embodiments the coordinator 310 may choose to split the CTA for a device 320 with many entries in its queue between subsequent superframes 710. This would be determined as a matter of fairness to allow the available $CTA_T$ to be divided fairly among the various devices 320.

Figure 14:
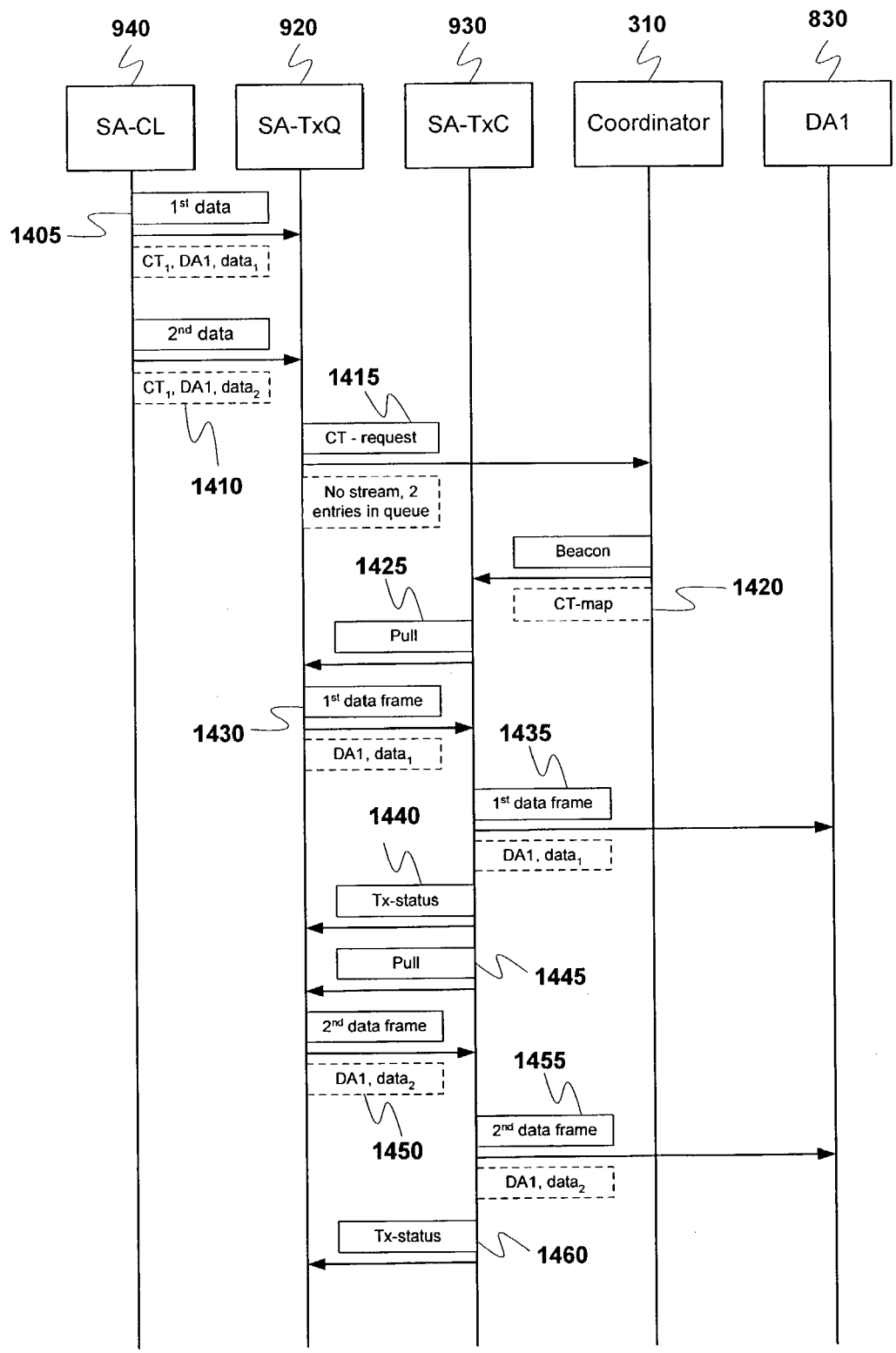
FIG. 14 is a message sequence chart showing how channel time is requested if more than a default channel time allocation is needed according to a preferred embodiment of the present invention.

FIG. 14 is a message sequence chart showing how channel time is requested in a system using a default CTA if more than a default CTA is needed according to a preferred embodiment of the present invention. As shown in FIG. 14, there are five elements involved in this communication: the convergence layer of the source device (SA CL) 940, the transmit queue of the source device (SA-TxQ) 920, the transmit controller of the source device (SA-TxC) 930, the coordinator 310, and a first destination device (reference by the first destination address—DA1) 830.

As shown in FIG. 14, the convergence layer 940 starts by queuing a first piece of data to the source device asynchronous transmit queue 920. (Step 1405) The convergence layer 920 passes the first data, the address of the destination device (DA1 in this case), and the required channel time $CT_1$. Since this is the first entry into the source device asynchronous transmit queue 920, the queue 920 need not send any information to the coordinator 310. The single entry in the queue 920 will be handled by the default CTA.

The convergence layer 910 then queues a second piece of data to the source device asynchronous transmit queue 920. (Step 1410) The convergence layer 920 passes the second data, the address of the destination device (DA1 in this case), and the required channel time $CT_2$. Since the source device asynchronous transmit queue 920 now has two entries, it now sends a channel time request to the coordinator 310 indicating that it is not a stream request and that it has two entries in its queue 920. (Step 1415)

Having received the channel time request in step 1415, the coordinator 310 sends a beacon to the transmit controller 930 of the source device. (Step 1420) The beacon may include a channel time map indicating what devices can transmit and for how long. This channel time map is preferably determined based on the calculations set forth above in Equation (1).

After receiving the beacon, the transmit controller 930 of the source device issues a pull command to the asynchronous transmit queue 920 requesting the first data to be transmitted to the first destination device 830. (Step 1425)

The asynchronous transmit queue 920 then sends the first data and first destination address DA1 to the transmit controller 930 so that they can be passed on to the PHY layer 410 for transmission. (Step 1430) And the transmit controller 930 then processes the first data and first destination address DA such that they are sent onward to the first destination device 830. (Step 1435)

Once the data frame has been transmitted in Step 1435, the transmit controller 930 sends a transmit status report to the asynchronous transmit queue 920 indicating the status of the transmission, e.g., success or failure. (Step 1440)

If the source device 820 has been allocated sufficient time during the current superframe to send another frame of data (which it has for the purposes of this example), the transmit controller 930 of the source device can issue another pull command to the asynchronous transmit queue 920 requesting the first data to be transmitted to the first destination device 830. (Step 1445)

The asynchronous transmit queue 920 then sends the second data and first destination address DA1 to the transmit controller 930 so that they can be passed on to the PHY layer 410 for transmission. (Step 1450) And the transmit controller 930 then processes the second data and first destination address DA such that they are sent onward to the first destination device 830. (Step 1455)

Once the data frame has been transmitted in Step 1455, the transmit controller 930 sends a transmit status report to the asynchronous transmit queue 920 indicating the status of the transmission, e.g., success or failure. (Step 1460)

Based on the results from the transmit status reports in Steps 1440 and 1460, the asynchronous transmit queue 920 will determine what will be done for the current entry in the queue based on the network's acknowledgement and retry policy.

If a transmit status report indicates success, the entry will be removed from the queue 920 and the asynchronous transmit queue 920 will report the success to the convergence layer 940 via the data handler and MAC management layer 910. If the transmit status report indicates a failure, the entry may or may not be removed. If there are available retries for the data, the asynchronous transmit queue 920 may keep the frame to allow for a retry. If no retries are available, the entry may be removed from the queue 920 and the asynchronous transmit queue 920 will report the failure to the convergence layer 940 via the data handler and MAC management layer 910.

The asynchronous transmit queue 920 may also decide to purge a frame due to aging, if it has passed the maximum time allowed in the queue 920. However the asynchronous transmit queue 920 is not allowed to purge any frame that is currently under transmission by the transmit controller 930.

Although the asynchronous transmit queue 920 need not send a channel time request when it first gets a single entry, in the case where the asynchronous transmit queue 920 falls to a single entry from a higher value, the asynchronous transmit queue 920 can actually request the default allocation by sending a channel time request indicating a single entry in the queue 920. In alternate embodiments the channel time request can be sent with a queue value of 0, indicating that the device will no longer use the ATS. In this case the device may enter a power saving mode.

Recovery From a Failed A TS Transfer

One primary reason for using asynchronous traffic in a quality of service (QoS) oriented network is service discovery and the negotiation of service parameters. However, once the service is established, asynchronous traffic can be used for maintenance and adjustments to the existing QoS.

Generally it can be assumed that the device providing the service has a better power supply than the average client device, e.g. set-top boxes or access points are often connected to the power grid while client devices may be battery powered. And those devices connected to better power supplies are the devices that can best afford to listen during the ATS period.

Therefore it is desirable to provide a network in which those devices with better power supplies are the devices most likely to have to listen during an ATS period. In addition, it is preferable that the network provide a reasonable level of power saving options for a low power device, regardless of the device's function in higher layers.

However, this is limited in ATS by the fact that asynchronous traffic is not as power efficient as isochronous traffic in a TDMA network. Nevertheless, efforts can be made to increase power efficiency.

In one embodiment, the source device intending to use the ATS should via convergence layer functions do its best to assure that the intended destination device is awake when the message is sent. Should the transmission fail despite this effort, the convergence layer should have a set of recovery procedures. One example of a suitable procedure would be to send a wake-up or "ping" message via another mechanism to the destination address check its current power save policy and to inform it that it has data to receive.

In addition, if power saving policies are static or change rarely, the coordinator 310 could provide information about the power save policies of the devices, limiting the chance that a message will be sent to a device in a power save mode.

A preferred method of recovering from a failed ATS transfer is to send a short asynchronous frame in the MTS of the source device notifying the destination device that it needs to listen for a message. By definition the MTS are short and so all devices can be required to listen during MTS time without a tremendous power cost.

An alternate method for recovering from a failed ATS transfer is to open a stream of isochronous data to the destination address using normal procedures for isochronous data, deliver the data frame(s) and then close the stream. Although it can be difficult to determine when the transfer is finished and the stream should be closed, this method can still allow a recovery.

In either case, the convergence layer 940 must decide the best method of recovery and calculate suitable parameters for the recovery transfer requests.

Sending Short Asynchronous Data Frames During an MTS

As described above, ATS 770 can be used for sending asynchronous data of any size up to a maximum allowable size, i.e., long or short asynchronous data as ATS-data frames. However, one aspect of the present invention allows a non-coordinator device 320 to send high priority short asynchronous data in an uplink MTS 330 assigned to it as an MTS-data frame when it has no management data to send to the coordinator 310.

In the preferred embodiment the coordinator 310 is assigned uplink MTS 630 just like a non-coordinator device 320. Since it has no need to send management data to itself, the coordinator 310 can use these MTS solely for sending MTS-data frames. In alternate embodiments, the coordinator 310 could pass MTS-data frames in downlink MTS 650 during which it had no management data to send. This could be in addition to or in place of using an uplink MTS 630.

As noted above, data to be transmitted can be assigned a particular priority, which indicates the traffic type of the data, and which the convergence layer 940 uses to select the appropriate MAC services for the data. This priority value can also be used for asynchronous data to determine whether it should be sent in as an ATS-data frame in an ATS 770 or as an MTS-data frame in an uplink MTS 630. Table 1 shows the frame values used in a preferred embodiment.

TABLE 2

| Frame Priority | Traffic Type | Asynchronous Frame Size | Data Frame Type |
|---|---|---|---|
| 0 (Default) | Best Effort (BE) | Long or short asynchronous frame | ATS-data frame |
| 1 | Background (BK) | Long or short asynchronous frame | ATS-data frame |
| 2 | — | n/a | Not used |
| 3 | Excellent Effort (EE) | n/a | Isochronous |
| 4 | Controlled Load (CL) | n/a | Isochronous |
| 5 | Video (VI) | n/a | Isochronous |
| 6 | Voice (VO) | n/a | Isochronous |
| 7 | Network Control (NC) | Short asynchronous frame | First try as MTS-data frame; then try as ATS-data frame |

As shown in Table 2, if a long or short asynchronous data frame is assigned a priority 0 or 1, the device 310, 320 will attempt to send it as an ATS-data frame via an ATS 770. If, however, a short asynchronous data frame has a priority of 7, the device 310, 320 will attempt to send it as an MTS-data frame via an unused uplink MTS 630, and if that is not possible will then try and send it as an ATS-data frame in an ATS 770.

If the length of an asynchronous data frame is greater than the maximum long asynchronous frame size length, it will not be able to receive a proper channel time and cannot be sent. If a long asynchronous frame (i.e., an asynchronous data frame with a length above the maximum short asynchronous frame length) is assigned a priority of 7, it will be treated as if it were of priority 0 or 1, and the device 310, 320 will attempt to send it as an ATS-data frame in an ATS 770.

For the purposes of polling, the assignment of an uplink MTS 630 can be considered an implied poll on the part of the coordinator 310. Essentially the coordinator 310 is asking the assigned non-coordinator device 310 to send any MTS-data frames it has if it doesn't have ay management frames to send.

In alternate embodiments a different priority scheme can be used. However, some sort of indicator (whether priority type or another variable) should be provided to indicate whether that the asynchronous frame should be sent as an ATS-data frame in an ATS 770 or as an MTS-data frame in an MTS.

Power Savings

A method for power savings if default CTA us used is to have the source device send a control frame requesting zero channel time and no stream when it has nothing to transmit during ATS 770. The coordinator can then remove the default CTA for that source device. However, since it has removed itself from the default CTA, the device must then subsequently request the default CTA for the first frame it wishes to send during the ATS 770 to get it back into being allocated a default channel time each superframe.

In other embodiments a given destination device can simply decide not to listen at all during ATS 770. The destination device should announce this policy to the coordinator 310 during association or during subsequent power save management frames. If destination devices have this option, it becomes the responsibility of the source device to retrieve power saving information from the coordinator 310 before transmitting in the ATS 770, or after a transmission in the ATS 770 has not been acknowledged. Such power saving information will inform the source device whether the desired destination device is in a power saving mode and needs to be woken up.

In such embodiments every device should listen during the MTS periods for short asynchronous data frames regardless of its power saving policy. Thus the source device could inform the destination device in an MTS that it has traffic to send, even if the destination device were in a power saving mode.

In another alternate embodiment, the source device could send a short asynchronous message to the coordinator 310, and let the coordinator 310 distribute it when the destination address exits the power saving mode. However, this would increase message latencies and would also complicate the implementation of the coordinator 31o, so it is preferable to have each device listen at least during every MTS.

In yet another embodiment a destination device could refuse to listen to any asynchronous traffic at all. Such a device would be effectively dead to most of the rest of the network. It could only request services but never participate in normal network activity.

Since this kind of deep sleep device would never respond to any service discovery or other broadcast request frames, it is highly unlikely that any other device would try to send a message to it. Any service management frame from a service provider to a deep sleep device would have to be sent in a reverse stream allocated by the device acting as server. In such a case it a source device mistakenly tries to send to a deep sleeping destination device, the effect will be the same as if the destination device was not associated in the network at all.

Three exemplary power saving modes are described below: low power, light sleep, and deep sleep. In the low power mode a device will listen to all MTS and ATS 770, but will only listen to GTS when it is announced as a destination device. In a light sleep mode the device will listen to all MTS, but will not listen to any ATS 770. In a deep sleep mode the device will not listen to any MTS or ATS 770.

A device in a light sleep can switch to a low power mode upon demand from the convergence layer. This might happen if the convergence layer 940 receives a message that there is asynchronous data to be received. Once the data is successfully received, the device can again be put to light sleep mode.

A device in a deep sleep mode will remain in the deep sleep mode until some set criteria awakens it.

According to a preferred embodiment of the present invention, there are two ways to announce to a light sleep device that there's data to receive: it can be done by beacon announcement; or it can be done through a short asynchronous data frame in an MTS (preferably issued by the convergence layer in the source device).

Using MTS data messages from the source device convergence layer has the advantage that source device can inform the destination device about the total length of the ATS 770 data frame(s).

Obviously, numerous modifications and variations of the present invention are possible in light of the above teachings. It is therefore to be understood that within the scope of the appended claims, the invention may be practiced otherwise than as specifically described herein.

I claim:

1. A method of transmitting wireless signals in a network comprising a network coordinator and one or more remote devices, comprising:
   dividing up available transmission time into a plurality of superframes;
   assigning only a single remote device chosen from the one or more remote devices to each of the plurality of superframes;
   dividing each of the plurality of superframes into a beacon duration, one or more management time slots, and one or more guaranteed time slots;
   assigning each management time slot to the single chosen remote device in a corresponding one of the plurality of superframes;
   assigning each guaranteed time slot to one of the one or more remote devices or to the network coordinator;
   sending a beacon from the coordinator to the one or more remote devices during the beacon duration of each of the plurality of superframes;
   sending one or more frames of isochronous data in a current guaranteed time slot from the one or more remote device or network coordinator assigned to the current guaranteed time slot; and
   sending one or more frames of asynchronous data in at least one of the one or more management time slots from either the network coordinator or the single chosen remote device in the corresponding one of the plurality of superframes,
   wherein the assigning of the single remote device chosen from the one or more remote devices to each of the plurality of superframes takes place during the beacon assigned to the respective superframe, and
   wherein the wireless signals are ultrawide bandwidth signals.

2. A method of transmitting wireless signals in a network, as recited in claim 1, wherein the one or more frames of asynchronous data are sent from the chosen remote device in the corresponding one of the plurality of superframes, and are sent to one of the network coordinator or another of the one of the one or more remote devices.

3. A method of transmitting wireless signals in a network, as recited in claim 1, wherein the one or more frames of asynchronous data are sent from the network coordinator, and are sent to either the one of the chosen remote device in the corresponding one of the plurality of superframes, or another of the one of the one or more remote devices.

4. A method of transmitting wireless signals in a network, as recited in claim 1, wherein the one or more management time slots in a given superframe includes at least
an uplink management time slot for transferring signals between the chosen device for the given superframe and the network coordinator, and
a downlink management time slot for transferring signals between the network coordinator and the chosen device for the given superframe.

5. A method of transmitting wireless signals in a network, as recited in claim 1,
wherein the beacon duration is formed at the beginning of each of the superframes, and
wherein the one or more management time slots are formed directly after the beacon duration.

6. A method of transmitting wireless signals in a network, as recited in claim 1, wherein the one or more frames of asynchronous data is sent from the single chosen remote device to another one of the one or more remote devices.

7. A method of transmitting wireless signals in a network, as recited in claim 1, wherein the asynchronous data is non-administrative asynchronous data.

8. A wireless transmitter, comprising:
means for dividing up available transmission time into a plurality of superframes;
means for assigning only a single remote device chosen from one or more remote devices to each of the plurality of superframes;
means for dividing each of the plurality of superframes into a beacon duration, one or more management time slots, and one or more guaranteed time slots;
means for assigning each management time slot to the single chosen remote device in a corresponding one of the plurality of superframes;
means for assigning each guaranteed time slot to one of the one or more remote devices or to a network coordinator;
means for sending a beacon from the coordinator to the one or more remote devices during the beacon duration of each of the plurality of superframes;
means for sending one or more frames of isochronous data in a current guaranteed time slot from the one or more remote device or network coordinator assigned to the current guaranteed time slot; and
means for sending one or more frames of asynchronous data in at least one of the one or more management time slots from either the network coordinator or the single chosen remote device in the corresponding one of the plurality of superframes,
wherein the means for assigning the single remote device chosen from the one or more remote devices to each of the plurality of superframes assigns the single remote device during the beacon assigned to the respective superframe, and
wherein the wireless signals are ultrawide bandwidth signals.

9. A wireless transmitter, as recited in claim 8, wherein the means for sending one or more frames of asynchronous data sends the one or more frames of asynchronous data from the chosen remote device in the corresponding one of the plurality of superframes, and to one of the network coordinator or another of the one of the one or more remote devices.

10. A wireless transmitter, as recited in claim 8, wherein the means for sending one or more frames of asynchronous data sends the one or more frames of asynchronous data from the network coordinator, and to either the one of the chosen remote device in the corresponding one of the plurality of superframes, or another of the one of the one or more remote devices.

11. A wireless transmitter, as recited in claim 8, wherein the one or more management time slots in a given superframe includes at least
an uplink management time slot for transferring signals between the chosen device for the given superframe and the network coordinator, and
a downlink management time slot for transferring signals between the network coordinator and the chosen device for the given superframe.

12. A wireless transmitter, as recited in claim 8, wherein the means for dividing each of the plurality of superframes into a beacon duration, one or more management time slots, and one or more guaranteed time slots forms the beacon duration at the beginning of each of the superframes, and forms the one or more management time slots directly after the beacon duration.

13. A wireless transmitter, as recited in claim 8, wherein the means for sending one or more frames of asynchronous data send the one or more frames of asynchronous data from the single chosen remote device to another one of the one or more remote devices.

14. A wireless transmitter, as recited in claim 8, wherein the asynchronous data is non-administrative asynchronous data.

* * * * *